United States Patent
Damnjanovic et al.

(10) Patent No.: US 9,264,930 B2
(45) Date of Patent: Feb. 16, 2016

(54) BUFFER STATUS REPORTING AND LOGICAL CHANNEL PRIORITIZATION IN MULTIFLOW OPERATION

(71) Applicant: QUALCOMM Incorporated, San Diego, CA (US)

(72) Inventors: Jelena Damnjanovic, Del Mar, CA (US); Sai Yiu Duncan Ho, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 13/915,583

(22) Filed: Jun. 11, 2013

(65) Prior Publication Data

US 2014/0126399 A1    May 8, 2014

Related U.S. Application Data

(60) Provisional application No. 61/723,698, filed on Nov. 7, 2012.

(51) Int. Cl.
*H04W 24/10* (2009.01)
*H04W 72/04* (2009.01)
(Continued)

(52) U.S. Cl.
CPC .......... *H04W 24/10* (2013.01); *H04W 72/0413* (2013.01); *H04W 72/0486* (2013.01);
(Continued)

(58) Field of Classification Search
USPC ........................................................ 370/252
See application file for complete search history.

(56) References Cited

U.S. PATENT DOCUMENTS 6,148,208 A * 11/2000 Love ............................. 455/442
2011/0242972 A1* 10/2011 Sebire et al. .................. 370/229
(Continued)

FOREIGN PATENT DOCUMENTS

EP    2197235 A2    6/2010
EP    2317815 A1    5/2011
(Continued)

OTHER PUBLICATIONS

Alcatel-Lucent et al., "MAC and PHY modifications required for dual connectivity support", 3GPP Draft; R2-131964, 3rd Generation Partnership Project (3GPP), Mobile Competence Centre; 650, Route Des Lucioles ; F-06921 Sophia-Antipolis Cedex; France vol. RAN WG2, no. Fukuoka, Japan; 20130520-20130524 May 11, 2013, XP050700105, pp. 1-4.

(Continued)

*Primary Examiner* — Michael Thier
*Assistant Examiner* — Yaotang Wang
(74) *Attorney, Agent, or Firm* — Arent Fox LLP

(57) ABSTRACT

Uplink reporting and logical channel prioritization in multiflow operation is described. In some embodiments, uplink reporting for multiflow operation utilizes bearer level splitting where the UE associates bearers or logical channel groups (LCGs) with cells for uplink reporting. In some embodiments, uplink reporting for multiflow operation utilizes packet level splitting where the UE groups buffers for all LCGs into a common pool for uplink reporting. In packet level splitting embodiments, the UE may perform uplink reporting based on the total amount of data available for transmission in the common buffer pool or by applying scaling coefficients associated with the serving cells. Some embodiments manage mapping of logical channel payloads to uplink grants for multiflow operation.

11 Claims, 18 Drawing Sheets

(51) Int. Cl.
H04W 76/02 (2009.01)
H04W 72/12 (2009.01)
H04L 5/00 (2006.01)

(52) U.S. Cl.
CPC ........ *H04W72/1252* (2013.01); *H04W 76/025* (2013.01); *H04L 5/001* (2013.01); *H04L 5/0032* (2013.01); *H04W 72/048* (2013.01)

(56) References Cited

U.S. PATENT DOCUMENTS

| | | | | |
|---|---|---|---|---|
| 2011/0300856 | A1* | 12/2011 | Aminaka | 455/422.1 |
| 2011/0310937 | A1* | 12/2011 | Lin et al. | 375/219 |
| 2012/0076103 | A1 | 3/2012 | Dai et al. | |
| 2012/0099452 | A1* | 4/2012 | Dai et al. | 370/252 |
| 2012/0281594 | A1 | 11/2012 | Stewart et al. | |
| 2012/0300720 | A1 | 11/2012 | Gou et al. | |
| 2015/0009923 | A1* | 1/2015 | Lei et al. | 370/329 |
| 2015/0110018 | A1* | 4/2015 | Rosa et al. | 370/329 |

FOREIGN PATENT DOCUMENTS

| | | |
|---|---|---|
| EP | 2498556 A1 | 9/2012 |
| WO | 2012089232 A1 | 7/2012 |
| WO | 2013005855 A1 | 1/2013 |
| WO | 2013116988 A1 | 8/2013 |

OTHER PUBLICATIONS

International Search Report and Written Opinion—PCT/US2013/068827—ISA/EPO—May 20, 2014.
Nokia Siemens Networks et al., "BSR for Carrier Aggregation", 3GPP Draft; R2-102805, BSR for Carrier Aggregation, 3rd Generation Partnership Project (3GPP), Mobile Copmetence Centre , 650, Route Des Lucioles ; F-06921 Sophia-Antipolis Cedex ; France, vol. RAN WG2, no. Montreal, Canada; 20100510-20100514, May 4, 2010, XP050423147, pp. 1-2.
CATT: "Impact of carrier aggregation on MAC layer", 3GPP Draft; R2-095484, no. Miyazaki; 20091012, Oct. 12, 2009, XP050390040, pp. 1-5.
Ericsson: "Uplink scheduling and BSRs with dual connectivity", 3GPP Draft; R2-133412 Uplink Scheduling and BSRS for Dual Connectivity, 3rd Generation Partnership Project (3GPP), Mobile Competence Centre; 650, Route Deslucioles; F-06921 Sophia-Antipolis Cedex; France, [Online], vol. RAN WG2, no. Ljubljana, Slovenia; 20131007-20131011, Sep. 28, 2013, XP050719173, pp. 1-3.
Pantech: "Considerations on signaling for separated ORA function", 3GPP Draft; R2-132503, 3rd Generation Partnership Project (3GPP), Mobile Competence Centre ; 650, Route Deslucioles; F-06921 Sophia-Antipolis Cedex; France, [On Line] vol. RAN WG2, no. Barcelona, Spain; 20130819-20130823, Aug. 9, 2013, XP050718204, pp. 1-5.
Partial International Search Report—PCT/US2013/068827—ISA/EPO—Apr. 11, 2014.
Renesas Mobile Europe: "On protocol stack impacts of dual connectivity", 3GPP Draft; R2-132405 Up Protcol Architecture V8, 3rd Generation Partnership Project (3GPP) , Mobile Competence Centre , 650, Route Deslucioles , F-06921 Sophia-Antipolis Cedex, France, [On line] vol. RAN WG2, no. Barcelona, Spain; 20130819-20130823, Aug. 9, 2013, XP050718161, pp. 1-6.
Renesas Mobile Europe: "User plane details related to the SCE user plane architecture selection", 3GPP Draft; R2-133310 User Plane Details Related to SCE User Plane Architecture Selection , 3rd Generation Partnership Project (3GPP), Mobile Competence Centre; 650, Route Des Lucioles ; F-06921 Sophia-Antipolis Cedex ; France, [On line] vol. RAN WG2, no. Ljubljana, Slovenia; 20131007-20131011, Sep. 27, 2013, XP050718986, pp. 1-3.
3GPP, "Cell vs. Frequency", 3GPP Draft; R2-103290 Cell VS Frequency, 3rd Generation Partnership Project (3GPP), Mobile Competence Centre; 650, Route Des Lucioles; F-06921 Sophia-Antipolis Cedex ; France, val. Ran WG2, no. Montreal, Canada; May 15, 2010, XP050423438.
Panasonic: "Details of Cross-Carrier Power Headroom Reports", 3GPP Draft; R2-103600, 3rd Generation Partnership Project (3GPP), Mobile Competence Centre ; 650, Route Des Lucioles ; F-06921 Sophia-Antipolis Cedex ; France, val. RAN WG2, no. Stockholm, Sweden; 20100628, Jun. 22, 2010, XP050451147.
Second Written Opinion from International Application No. PCT/US2013/068827, dated Dec. 1, 2014, 20 Pages.

* cited by examiner

BUFFER STATUS REPORTING AND LOGICAL CHANNEL PRIORITIZATION IN MULTIFLOW OPERATION

CROSS-REFERENCE TO RELATED APPLICATION(S)

This application claims the benefit of U.S. Provisional Application Ser. No. 61/723,698, entitled "BUFFER STATUS REPORTING AND LOGICAL CHANNEL PRIORITIZATION IN MULTIFLOW OPERATION" and filed on Nov. 7, 2012, which is expressly incorporated by reference herein in its entirety.

BACKGROUND

1. Field

Aspects of the present disclosure relate generally to wireless communication systems, and more particularly, to multiflow communications between a wireless device and multiple network nodes.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or Node-Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

Some UEs such as smartphones support many types of communications that have different quality of service (QoS) requirements. For example, some types of communications such as voice communications have more stringent requirements in terms of latency while other types of communications such as web browsing and FTP have lower requirements in terms of latency but require a much lower packet loss rate. Supporting different types of communications from many active UEs presents challenges in modern communication systems.

SUMMARY

In multiflow operation, a user equipment (UE) may have multiple active component carriers for communication with multiple eNBs at the same time. In some instances, the eNBs may have a fiber or other high capacity connection that allows the eNBs to dynamically control uplink data flow from the UE to the multiple eNBs on a frame by frame basis. In other instances, the eNBs may be able to exchange semi-static information (e.g., context information, radio resource control, etc.) but may not be able to dynamically control data flow.

Described embodiments are directed to providing uplink flow control for uplink component carriers in multiflow operation. Some embodiments are directed to uplink reporting in multiflow operation. These embodiments include techniques for managing Scheduling Requests (SR) and Buffer Status Reporting (BSR) for multiflow operation. Some embodiments are directed to logical channel prioritization in multiflow operation. These embodiments include techniques for managing mapping of packet payloads to uplink grants for multiflow operation.

Some embodiments utilize bearer level splitting for uplink reporting where the UE associates bearers or logical channel groups (LCGs) with nodes for uplink reporting. The UE may perform uplink reporting independently for each node based on the available data for uplink transmission in the LCG buffers associated with the node.

Some embodiments utilize packet level splitting where the UE groups buffers for all LCGs into a common pool for uplink reporting. In some packet level splitting embodiments, the UE may perform uplink reporting based on the total amount of data available for transmission in the common buffer pool for reporting buffer status. In some packet level splitting embodiments, scaling coefficients may be determined for each node and uplink reporting may be based on the total amount of data available for transmission in the common buffer pool scaled by the respective coefficients.

In one aspect of the disclosed embodiments, a method of wireless communication performed by a user equipment (UE) in communication with a first cell and a second cell includes establishing a first component carrier at the UE associated with the first cell, establishing a second component carrier at the UE associated with the second cell while maintaining the first component carrier, determining a set of logical channel groups having available data for uplink transmission from the UE, transmitting first uplink reporting information to the first cell, the first uplink reporting information based at least in part on the available data, and transmitting second uplink reporting information to the second cell, the second uplink reporting information based at least in part on the available data. The first uplink reporting information may be transmitted to the first cell over the first component carrier and the second uplink reporting information may be transmitted to the second cell over the second component carrier. The method may include receiving a first configuration assigning first resources for transmission of uplink grant requests for the first component carrier and receiving a second configuration assigning second resources for transmission of uplink grant requests for the second component carrier.

In some embodiments utilizing bearer level splitting for uplink reporting, the method includes associating a first logical channel group of the set of logical channel groups with the first cell, determining a first buffer status value based at least in part on a first amount of the available data associated with the first logical channel group, associating a second logical channel group of the set of logical channel groups with the second cell, and determining a second buffer status value based at least in part on a second amount of the available data associated with the second logical channel group. The method may include reporting the first buffer status value to the first cell in the transmission of the first uplink reporting information, and reporting the second buffer status value to the second cell in the transmission of the second uplink reporting information. The first logical channel group and the second logical channel group may be associated with the same logical channel identifier at the radio link control sublayer of the UE.

In some embodiments, the method utilizes packet level splitting for uplink reporting. In these embodiments, the method includes detecting that a buffer status reporting condition has occurred for the first cell, determining a first buffer status value based at least in part on a total amount of the available data for the set of logical channel groups upon occurrence of the buffer status reporting condition for the first cell, and reporting the first buffer status value to the first cell in the transmission of the first uplink reporting information.

In some packet level splitting embodiments, the method includes detecting a subsequent buffer status reporting opportunity associated with the second cell, determining a second buffer status value based at least in part on the total amount of the available data for the set of logical channel groups at a time of the occurrence of the buffer status reporting condition for the first cell, reporting the second buffer status value to the second cell in the transmission of the second uplink reporting information. The reporting of the first buffer status value to the first cell may be performed using first resources of the first component carrier and the reporting of the second buffer status value to the second cell may be performed using second resources of the second component carrier. The first and second resources may be corresponding resources, or the first and second resources may be orthogonal resources. The method may include signaling a first scheduling request to the first cell to request the first resources and signaling a second scheduling request to the second cell to request the second resources. The signaling of the first scheduling request may include transmission of the first scheduling request on the first component carrier and the signaling of the second scheduling request may include transmission of the second scheduling request on the second component carrier.

In some packet level splitting embodiments, the method includes detecting a subsequent buffer status reporting opportunity associated with the second cell, determining a second buffer status value based at least in part on a subsequent total amount of the available data for the set of logical channel groups upon occurrence of the subsequent buffer status reporting opportunity, and reporting the second buffer status value to the second cell in the transmission of the second uplink reporting information.

In some packet level splitting embodiments, the method includes establishing a first component carrier at the UE associated with the first cell, establishing a second component carrier at the UE associated with the second cell while maintaining the first component carrier, determining a set of logical channel groups having available data for uplink transmission from the UE, detecting that a first buffer status reporting condition has occurred, determining a first buffer status value based at least in part on a total amount of the available data for the set of logical channel groups upon occurrence of the first buffer status reporting condition, comparing the total amount of the available data to a threshold, and reporting the first buffer status value to the first cell, the second cell, or both based on the comparison.

In some packet level splitting embodiments, the method includes determining a first buffer reporting coefficient associated with the first cell and a second buffer reporting coefficient associated with the second cell. The first buffer status value may be determined based at least in part on the total amount of the available data for the set of logical channel groups and the first buffer reporting coefficient and the second buffer status value may be determined based at least in part on the total amount of the available data for the set of logical channel groups and the second buffer reporting coefficient. The first and second buffer reporting coefficients may be determined by the UE based at least in part on one or more of loading information, channel quality, and/or measured service metrics associated with one or both of the first or second cells.

In some packet level splitting embodiments, the scaling coefficients for each cell may be determined for each logical channel group. For these embodiments, the method includes determining a first buffer reporting coefficient associated with the first cell for a first logical channel group of the set of logical channel groups, determining a second buffer reporting coefficient associated with the first cell for a second logical channel group of the set of logical channel groups. The method may include transmitting a first set of data associated with the first logical channel group in a first portion of an uplink grant of the first component carrier, wherein the first portion of the uplink grant is allocated to the first logical channel group in accordance with the first buffer reporting coefficient and/or transmitting a second set of data associated with the second logical channel group in a second portion of the uplink grant, wherein the second portion of the uplink grant is allocated to the second logical channel group in accordance with the second buffer reporting coefficient.

Some embodiments are directed to a method for wireless communications performed by a first cell of a wireless communications network. The method may include establishing a first component carrier for communication with a UE, determining an uplink service ratio associated with the UE for allocating resources of the first cell and a second cell in communication with the UE over a second component carrier, receiving uplink reporting information indicating an amount of uplink data available at the UE for transmission to the first cell, and scheduling uplink resources of the first component carrier for the UE based at least in part on the uplink reporting information. The uplink service ratio may be determined based at least in part on loading information associated with one or both of the first or second cells. The method may include determining a scaling coefficient for the first component carrier based on the uplink service ratio, and transmitting the scaling coefficient to the UE.

Other disclosed embodiments include an apparatus including modules configured to perform the disclosed methods, an apparatus including one or more means for performing the disclosed methods, and computer program products that include program code for performing the disclosed methods.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
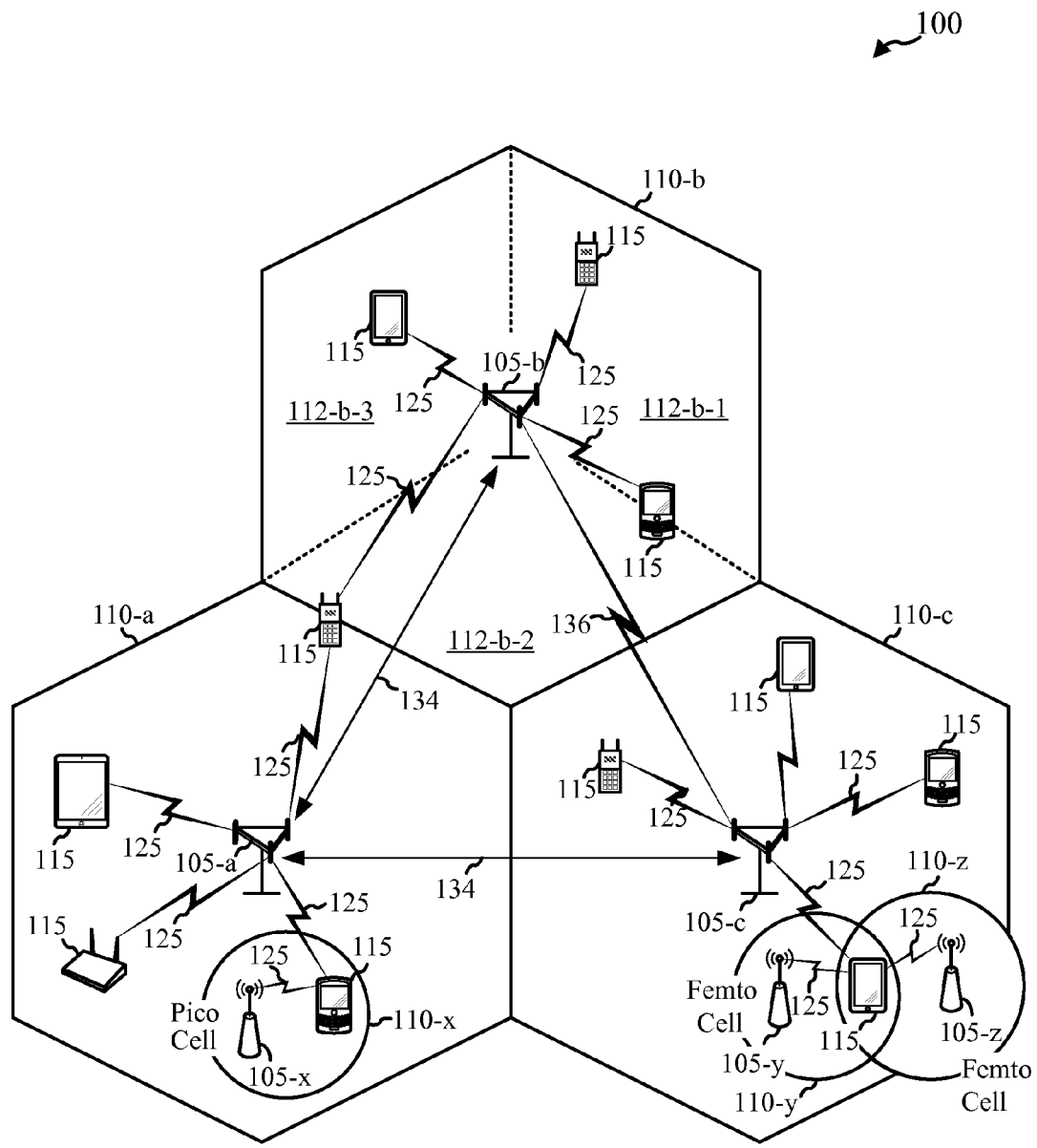
FIG. 1 shows a block diagram of a wireless communications system in accordance with various embodiments.
Figure 1:
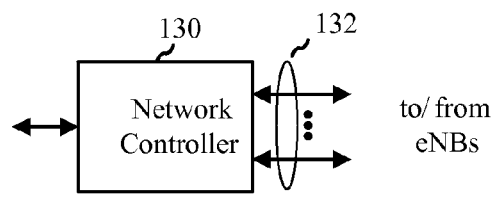

Methods, systems, and devices are described for uplink reporting and logical channel prioritization in multiflow operation. Some embodiments manage Scheduling Requests (SR) and Buffer Status Reporting (BSR) for multiflow operation. Some embodiments manage mapping of packet payloads to uplink grants for multiflow operation.

Some embodiments utilize bearer level splitting for uplink reporting where the UE associates bearers or logical channel groups (LCGs) with nodes for uplink reporting. The UE may perform uplink reporting independently for each node based on the available data for uplink transmission in the LCG buffers associated with the node.

Some embodiments utilize packet level splitting where the UE groups buffers for all LCGs into a common pool for uplink reporting. In some packet level splitting embodiments, the UE may perform uplink reporting based on the total amount of data available for transmission in the common buffer pool for reporting buffer status. In some packet level splitting embodiments, scaling coefficients may be determined for each node and uplink reporting may be based on the total amount of data available for transmission in the common buffer pool scaled by the respective coefficients.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, a base transceiver station, a radio base station, a radio transceiver, a transceiver function, a basic service set (BSS), an extended service set (ESS), or some other suitable terminology. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 105-a, 105-b, and 105-c are macro eNBs for the macro cells 110-a, 110-b, and 110-c, respectively. The eNB 105-x is a pico eNB for a pico cell 110-x. And, the eNBs 105-y and 105-z are femto eNBs for the femto cells 110-y and 110-z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 105 via a backhaul 132. The eNBs 105 may also communicate with one another, e.g., directly or indirectly via a wireline backhaul 134 or a wireless backhaul 136.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a smart phone, a session initiation protocol (SIP) phone, a satellite radio, a global positioning system, a multimedia device, a video device, a digital audio player (e.g., MP3 player), a camera, a game console, or any other similar functioning device. A UE may be able to communicate with macro eNBs, pico eNBs, femto eNBs, relays, and the like.

System 100 shows transmissions 125 between mobile devices 115 and base stations 105. The transmissions 125 may include uplink (UL) and/or reverse link transmission, from a mobile device 115 to a base station 105, and/or downlink (DL) and/or forward link transmissions, from a base station 105 to a mobile device 115. LTE/-A utilizes orthogonal frequency division multiplexing (OFDM) on the downlink and single-carrier frequency division multiple-access (SC-FDMA) on the uplink. OFDM and SC-FDMA partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDMA. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
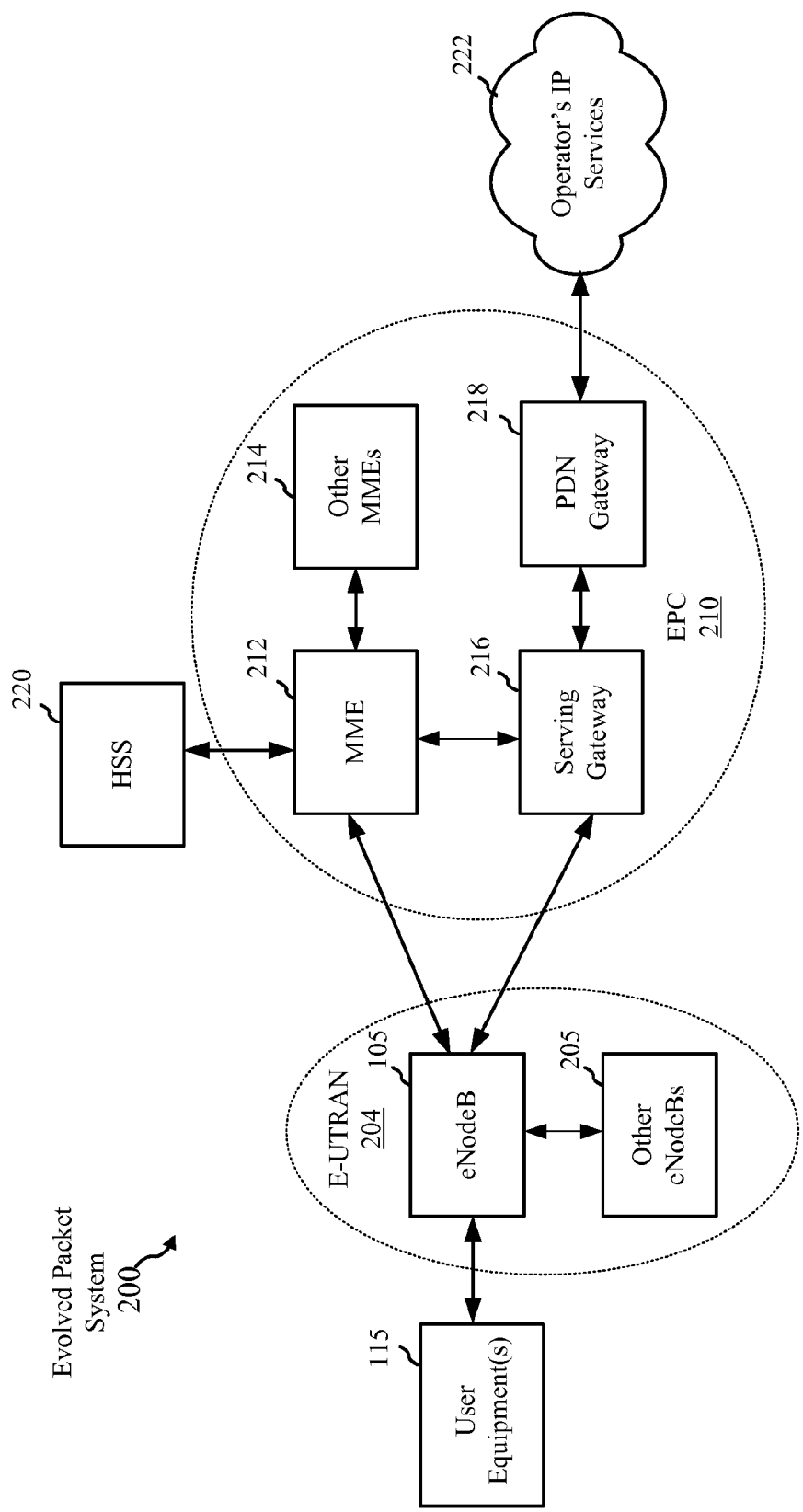
FIG. 2 is a diagram illustrating a network architecture in accordance with various embodiments.

FIG. 2 is a diagram illustrating an LTE network architecture 200 in accordance with various embodiments. The LTE network architecture 200 may be referred to as an Evolved Packet System (EPS) 200. The EPS 200 may include one or more user equipments (UEs) 115, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 105 and other eNBs 205. The eNB 105 provides user and control plane protocol terminations for the UE 115. The eNB 105 may be connected to the other eNBs 205 via an X2 interface (e.g., backhaul). The eNB 105 provides an access point to the EPC 210 for a UE 115.

The eNB 106 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 102 and the EPC 110. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 may include the Internet, the Intranet, an IP Multimedia Subsystem (IMS), and a PS Streaming Service (PSS).

Figure 3:
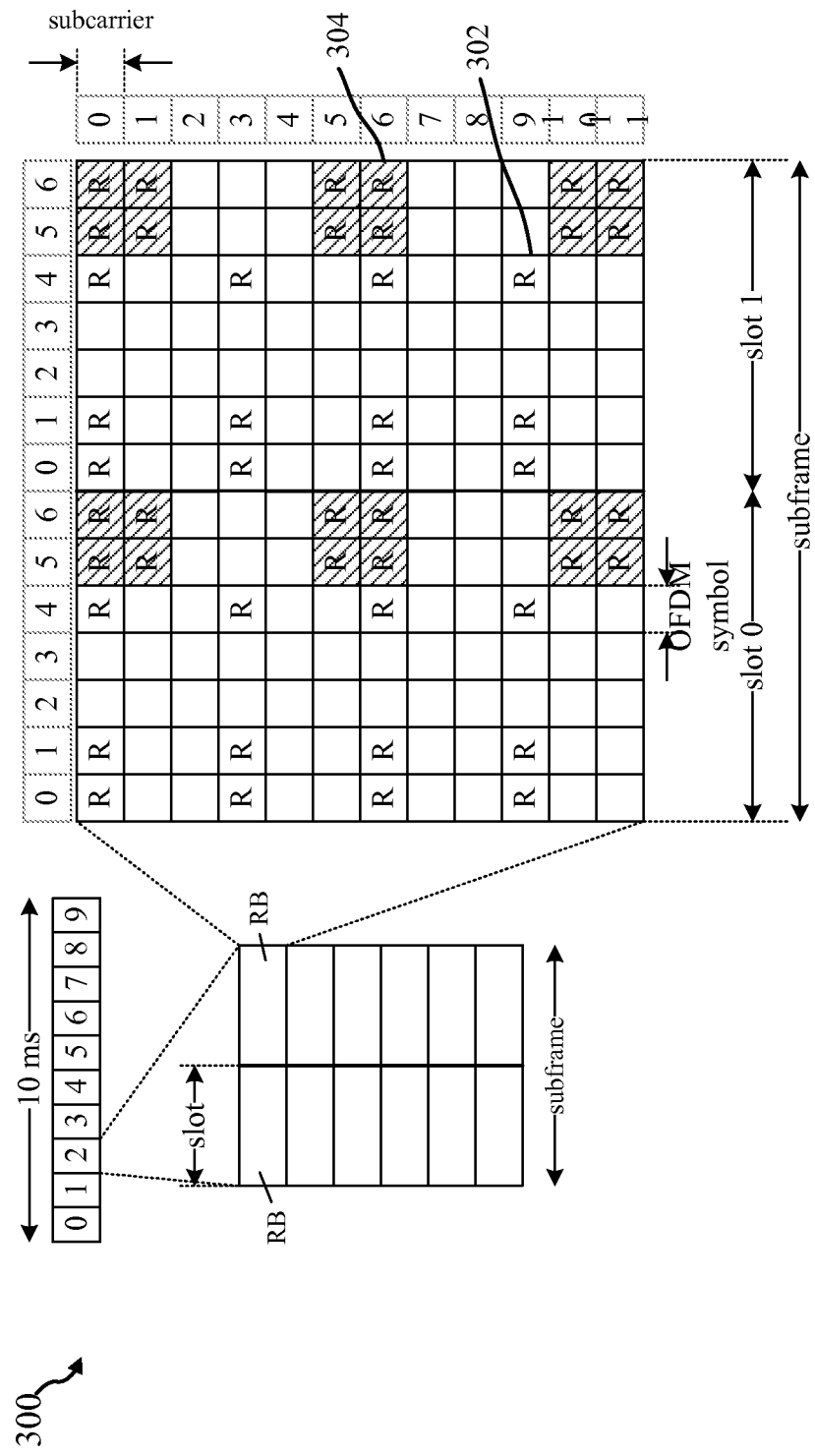
FIG. 3 is a diagram illustrating an example of a downlink frame structure in accordance with various embodiments.

FIG. 3 is a diagram 300 illustrating an example of a downlink (DL) frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). Some of the resource elements may include data. As shown in FIG. 3, the DL-RS includes Cell-specific RS (CRS) (which may be referred to as common RS) 302 and UE-specific RS (UE-RS) 304 (shown with antenna port 9 or 10 configuration). UE-RS 304 are not transmitted on the resource blocks upon which the corresponding physical DL control channel (PDCCH) is mapped. As such, UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

FIG. 3 is a diagram 300 illustrating an example of a downlink (DL) frame structure in LTE. A frame (e.g., 10 ms, etc.) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). Some of the resource elements may include data. As shown in FIG. 3, the DL-RS includes Cell-specific RS (CRS) (which may be referred to as common RS) 302 and UE-specific RS (UE-RS) 304 (shown with antenna port 9 or 10 configuration). UE-RS 304 are not transmitted on the resource blocks upon which the corresponding physical DL control channel (PDCCH) is mapped. As such, UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
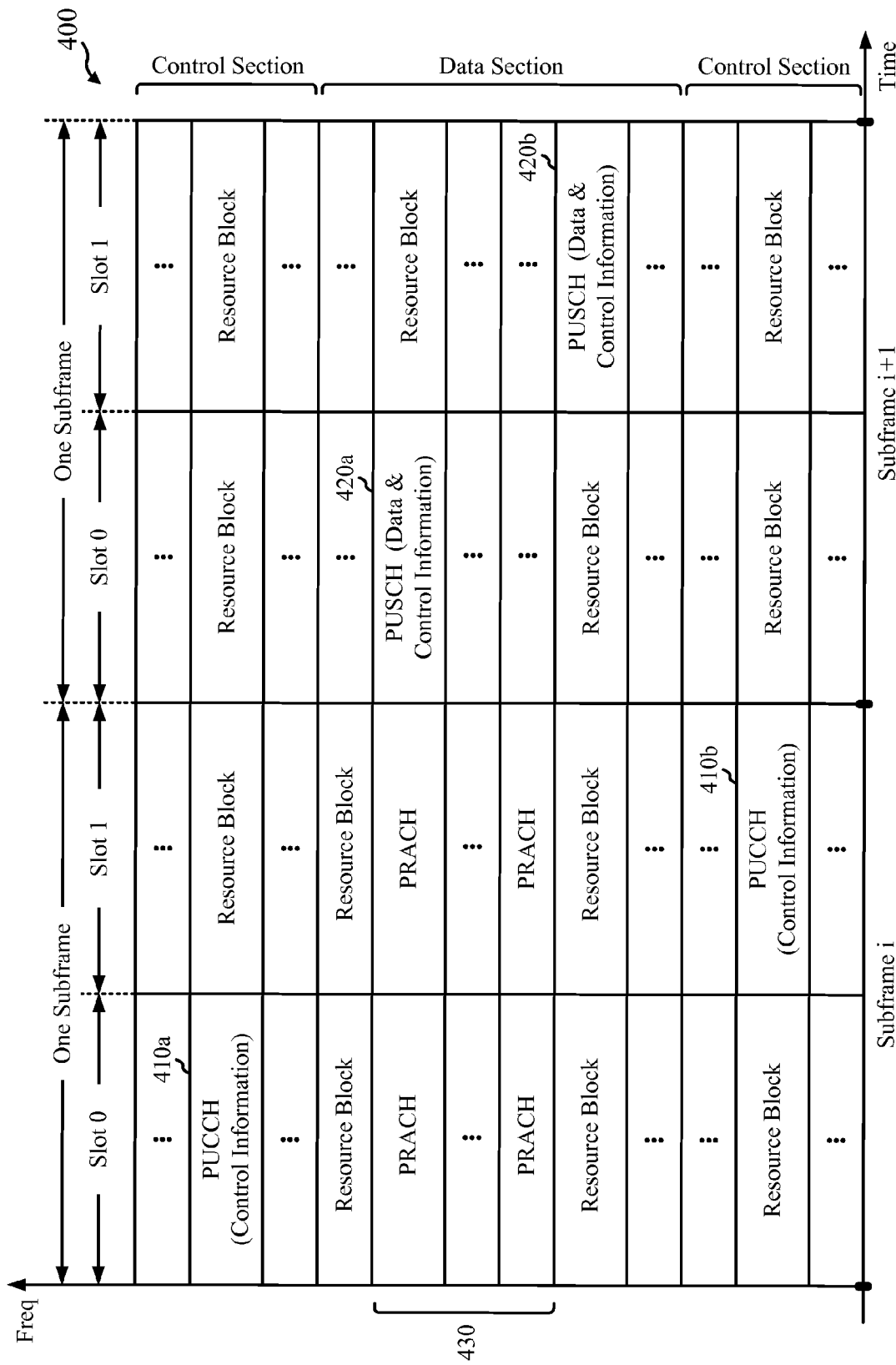
FIG. 4 is a diagram illustrating an example of an uplink frame structure in accordance with various embodiments.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410-a, 410-b in the control section to transmit control information to an eNB. The UE may also be assigned resource blocks 420-a, 420-b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
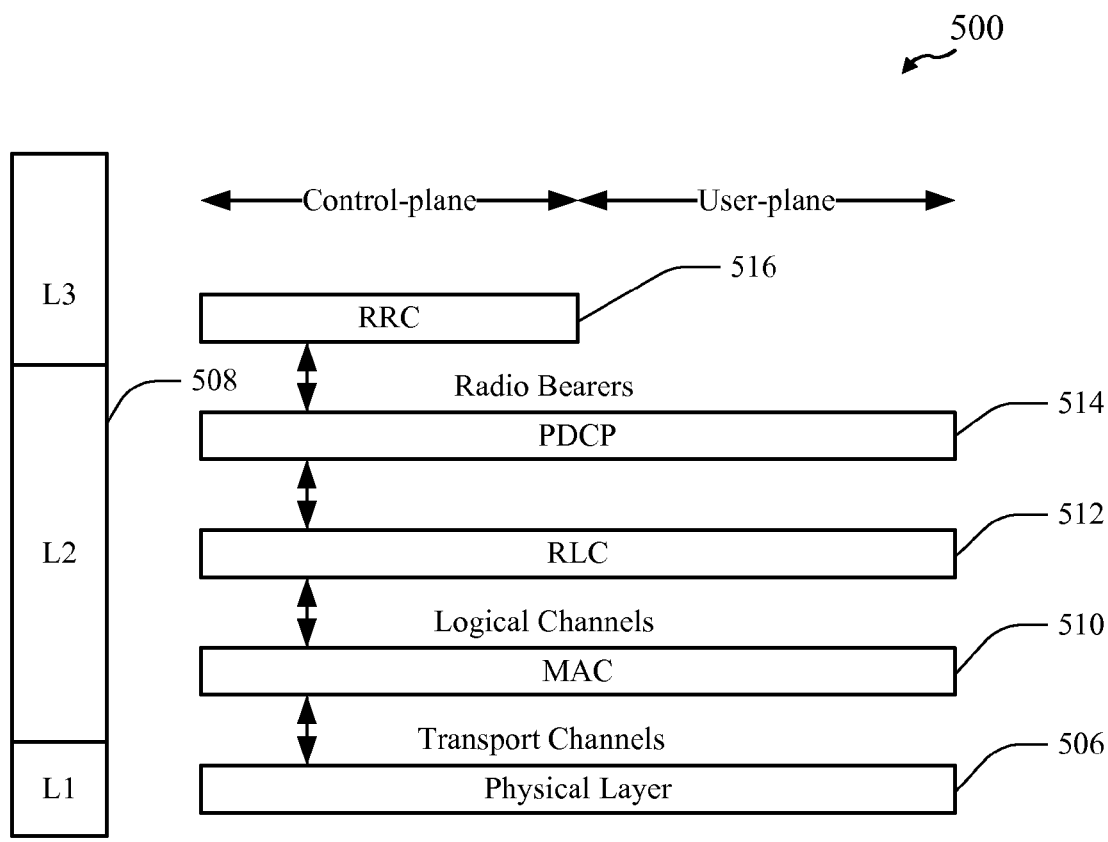
FIG. 5 is a diagram illustrating an example of a radio protocol architecture for the user and control planes in accordance with various embodiments.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 218 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The RLC sublayer 512 passes data to the MAC sub layer 510 as logical channels.

The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations. The MAC layer formats and sends the logical channel data to the physical layer 506 as transport channels.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

In multiflow operation, a UE 115 may support uplink transmission using multiple component carriers to multiple cells (e.g., eNBs 105, etc.) concurrently. While the UE 115 can communicate independently to each cell, the UE 115 may have a single primary cell (PCell) and one or more secondary cells (SCells). Described embodiments are directed to uplink reporting and logical channel prioritization in multiflow operation. Some embodiments manage Scheduling Requests (SR) and Buffer Status Reporting (BSR) for multiflow operation. Some embodiments manage mapping of packet payloads to uplink grants for multiflow operation.

In some embodiments, the UE may transmit one BSR (e.g., periodically or upon being triggered) in a transmission time interval (TTI). The UE may determine which cell, or on which component carrier, to transmit the one BSR. In other embodiments, the UE may transmit a plurality of BSRs to a plurality of cells, respectively. The plurality of BSRs may be transmitted during the same TTI or different TTIs.

Some embodiments utilize bearer level splitting for uplink reporting where the UE associates bearers or logical channel groups (LCGs) with nodes for uplink reporting. The UE may perform uplink reporting independently for each node based on the available data for uplink transmission in the LCG buffers associated with the node.

Some embodiments utilize packet level splitting where the UE groups buffers for all LCGs into a common pool for uplink reporting. In some packet level splitting embodiments, the UE may perform uplink reporting based on the total amount of data available for transmission in the common buffer pool for reporting buffer status. In some packet level splitting embodiments, scaling coefficients may be determined for each node and uplink reporting may be based on the total amount of data available for transmission in the common buffer pool scaled by the respective coefficients.

Figure 6:
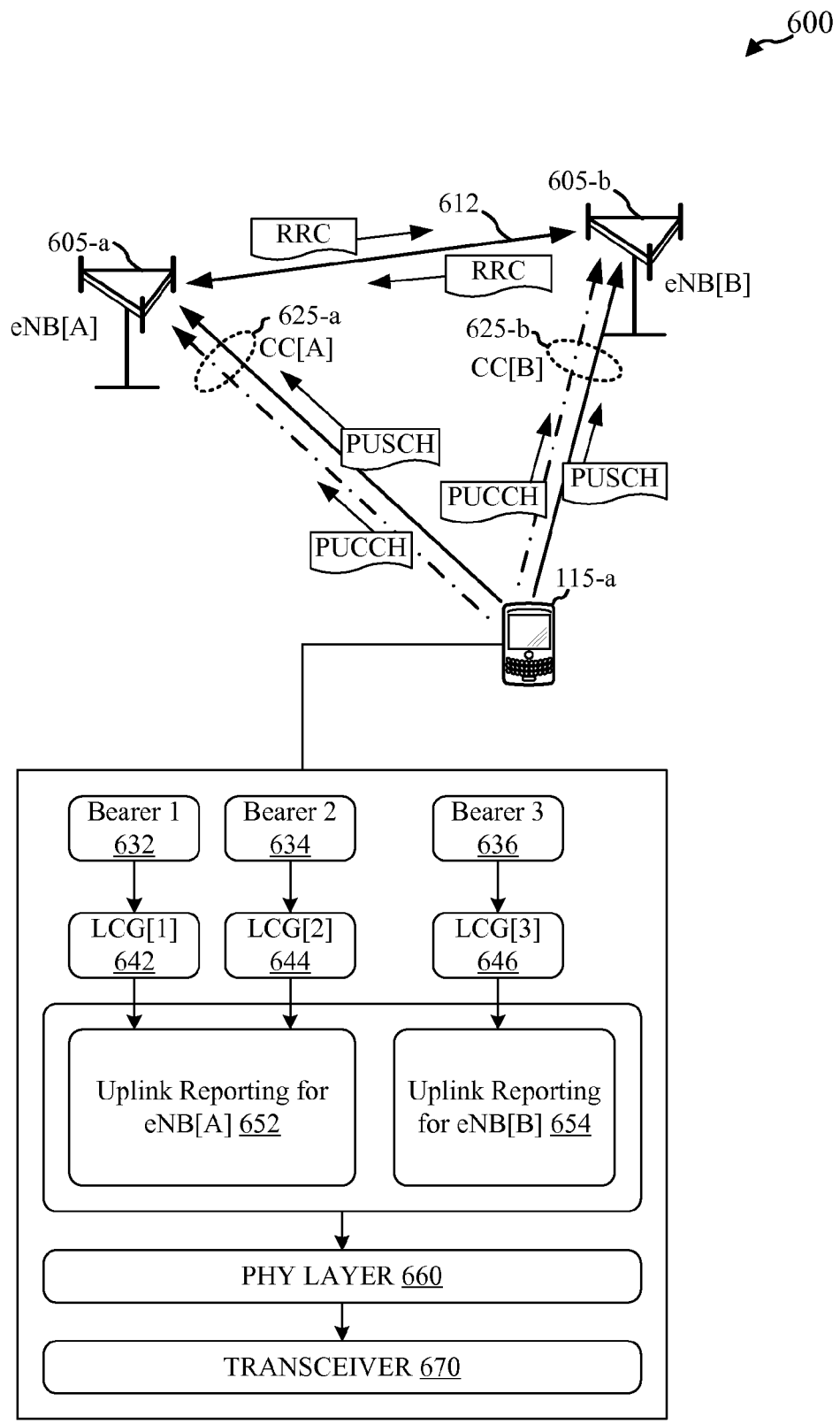
FIG. 6 illustrates a wireless communications system for multiflow uplink communications using bearer level splitting in accordance with various embodiments.

FIG. 6 illustrates a wireless communications system 600 for multiflow uplink communications using bearer level splitting in accordance with various embodiments. In wireless communications system 600, UE 115-*a* is configured to communicate (via transceiver 670, etc.) with multiple eNBs substantially concurrently (e.g., during a single transmission time interval (TTI) or frame, etc.) over multiple component carriers. In FIG. 6, UE 115-*a* communicates with eNB[A] over uplink component carrier CC[A] 625-*a* and with eNB[B] over uplink component carrier CC[B] 625-*b*. According to the architecture of FIG. 6, eNB[A] 605-*a* may be the PCell for UE 115-*a* while eNB[B] 605-*b* may be an SCell. UE 115-*a* may also be configured to receive multiple downlink component carriers from eNB[A] 605-*a*, eNB[B] 605-*b*, and/or other eNBs. eNB[A] 605-*a* may communicate with eNB[B] 605-*b* over a backhaul link 612, which may be a wireline or wireless backhaul link. While FIG. 6 illustrates UE 115-*a* in communication with two eNBs using two component carriers, the described embodiments for bearer level splitting may be used when UE is using multiflow operation with any number of eNBs.

UE 115-*a* may have multiple bearers (e.g., bearers 632, 634, 636) where each bearer is associated with a set of Quality of Service (QoS) requirements. Bearers support sessions of the UE 115-*a* (e.g., applications, services, etc.) and may support multiple packet flows to multiple sessions. Bearers with the same needs may be grouped into logical channel groups (LCGs). That is, logical channel groups may include one or more logical channels. Each logical channel group may be associated with a logical channel ID (LCID). When the sessions generate data (e.g., IP packets) and the data is formatted into Bearer SDUs (e.g., Packet Data Convergence Protocol (PDCP) SDUs, etc.) the bearer SDUs are input into buffers associated with the LCGs.

Logical channel IDs may be assigned to LCGs using common mapping or exclusive mapping. FIG. 6 illustrates exclusive mapping where logical channels IDs are not duplicated across eNBs. In some bearer level splitting embodiments, LCGs assigned to different eNBs may share logical channel IDs. For these embodiments, the MAC layer manages logical channel ID mapping between the logical channel groups and the physical layer 660 to direct uplink and downlink data from LCGs at the RLC and/or PDCP sublayers with the same logical channel ID to and from the appropriate eNB and/or component carrier resources at the physical layer 660.

When UEs have uplink data to send in the LCG buffers, the UE may signal for uplink grants by signaling a Scheduling Request (SR) in resources of an uplink control channel configured (e.g., via RRC, etc.) by the eNB. For example, eNB [A] 605-*a* may configure PUCCH resources on CC[A] 625-*a* for UE 115-*a* for sending Scheduling Requests. Once a UE has uplink grants, a Buffer Status Report (BSR) is sent from the UE to the eNB to provide information about the amount of pending data in the uplink buffer of the UE. BSR may be triggered based on an elapsed time period between reports (periodic BSR), based on padding in uplink grants (padding BSR), and/or other factors. A BSR may include a buffer status value, which may be an index to a logarithmic or semi-logarithmic table of buffer size values.

In embodiments using bearer level splitting for multiflow operation, UEs associate logical channel groups with eNBs for which the UE has a component carrier established. The UE then generates uplink reporting metrics for each eNB independently for each eNB. The uplink reporting metrics may be transmitted to each eNB over the component carriers associated with each eNB or over one component carrier to a primary eNB for distribution by primary eNB the to the other eNBs configured to receive uplink data from the UE. For example, SR for uplink grants and BSR may be performed independently for each eNB in bearer level splitting.

As illustrated in FIG. 6, UE 115-*a* has three logical channel groups, LCG[1] 642, LCG[2] 644, and LCG[3] 646. UE 115-*a* associates LCG[1] 642 and LCG[2] 644 with eNB[A] 605-*a* and LCG[3] 646 with eNB[B] 605-*b*. Uplink reporting for eNB[A] 652 may be performed independently from uplink reporting for eNB[B] 654 based on the LCGs assigned to each eNB. In embodiments, UE 115-*a* maintains separate timers for each eNB. For example, UE 115-*a* may maintain separate retxBSR and periodicBSR timers for eNB[A] and eNB[B].

Figure 7:
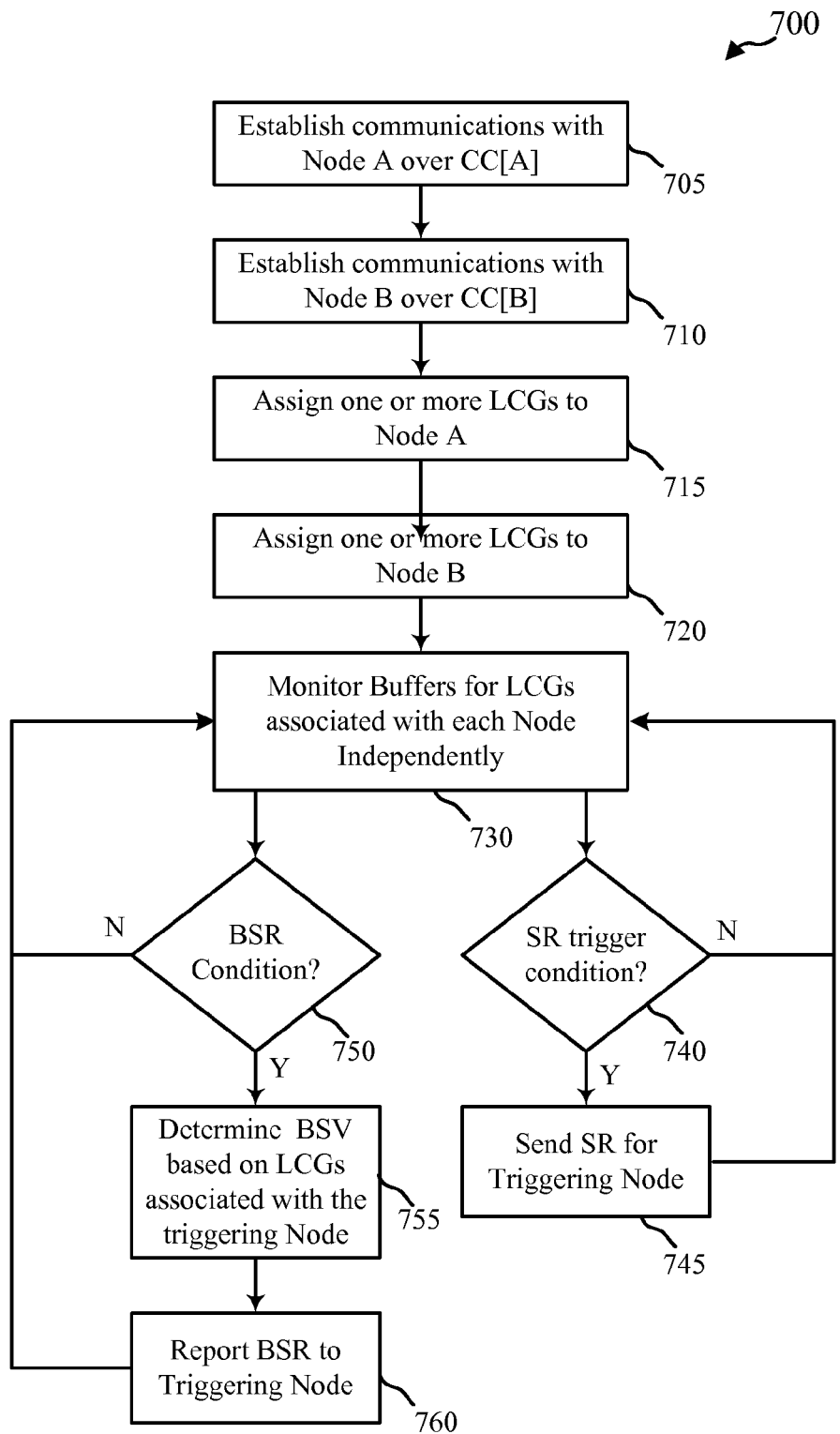
FIG. 7 illustrates a block diagram of a method for bearer level splitting in multiflow operation in accordance with various embodiments.

FIG. 7 illustrates a block diagram of a method 700 for bearer level splitting in multiflow operation in accordance with various embodiments. Method 700 may be performed, for example, by UE 115-*a* illustrated in FIG. 6.

At block 705, a connection may be established between UE 115-*a* and eNB[A] 605-*a* over component carrier A 625-*a*. At block 710, a connection may be established between UE 115-*a* and eNB[B] 605-*b* over component carrier B 625-*b*. Component carriers A and B may be configured and maintained by UE 115-*a* for communications utilizing either component carrier A, or component carrier B, or both of component carriers A and B concurrently for uplink transmissions.

At block 715, UE 115-*a* may assign one or more LCGs for uplink reporting 652 to eNB[A] 605-*a*. For example, UE 115-*a* may assign LCG[1] 642 and LCG[2] 644 for uplink reporting 652 to eNB[A] 605-*a* as illustrated in FIG. 6. At block 720, UE 115-*a* may assign one or more LCGs for uplink reporting 654 to cell eNB[B] 605-*b*. For example, UE 115-*a* may assign LCG[3] 646 for uplink reporting 654 to eNB[B] 605-*b* as illustrated in FIG. 6.

At block 730, UE 115-*a* monitors LCGs assigned to each eNB and generates uplink reporting for each eNB based on the buffers for the LCGs assigned to that eNB. For example, UE 115-*a* may perform uplink reporting for eNB[A] 605-*a* based on data available for uplink transmission in buffers associated with LCG[1] 642 and LCG[2] 644. UE 115-*a* may generate uplink reporting for eNB[B] 605-*b* based on data available for uplink transmission in the buffer associated with LCG[3] 646.

If an SR trigger condition occurs at block 740, the UE 115-a may signal SR to the triggering eNB at the next available SR resources at block 745. For example, SR may be triggered for eNB[A] 605-a when data is available in the buffers associated with LCG[1] and/or LCG[2] and no uplink grant is scheduled for the available data. UE 115-a may signal SR on the next available SR transmission opportunity (e.g., configured resources of the PUCCH of CC[A] 625-a, etc.). In response to the SR signal by UE 115-a, eNB[A] 605-a may determine uplink resources for UE 115-a and send an uplink grant to UE 115-a for uplink transmission on certain resources of CC[A] 625-a (e.g., PUSCH resources).

If a BSR trigger condition occurs at block 750 for an eNB, the UE 115-a may determine a buffer status value based on the amount of available data for LCGs associated with the triggering eNB at block 755. The UE 115-a may report the buffer status value (BSV) to the triggering eNB at block 760. The UE 115-a may determine a buffer status value for eNB [B] 605-b based on the available data for LCG[3] 646. In some embodiments, BSR may be reported according to LCID. For example, the UE 115-a may report a buffer status value and an LCID for each LCG in a single BSR element.

Figure 8:
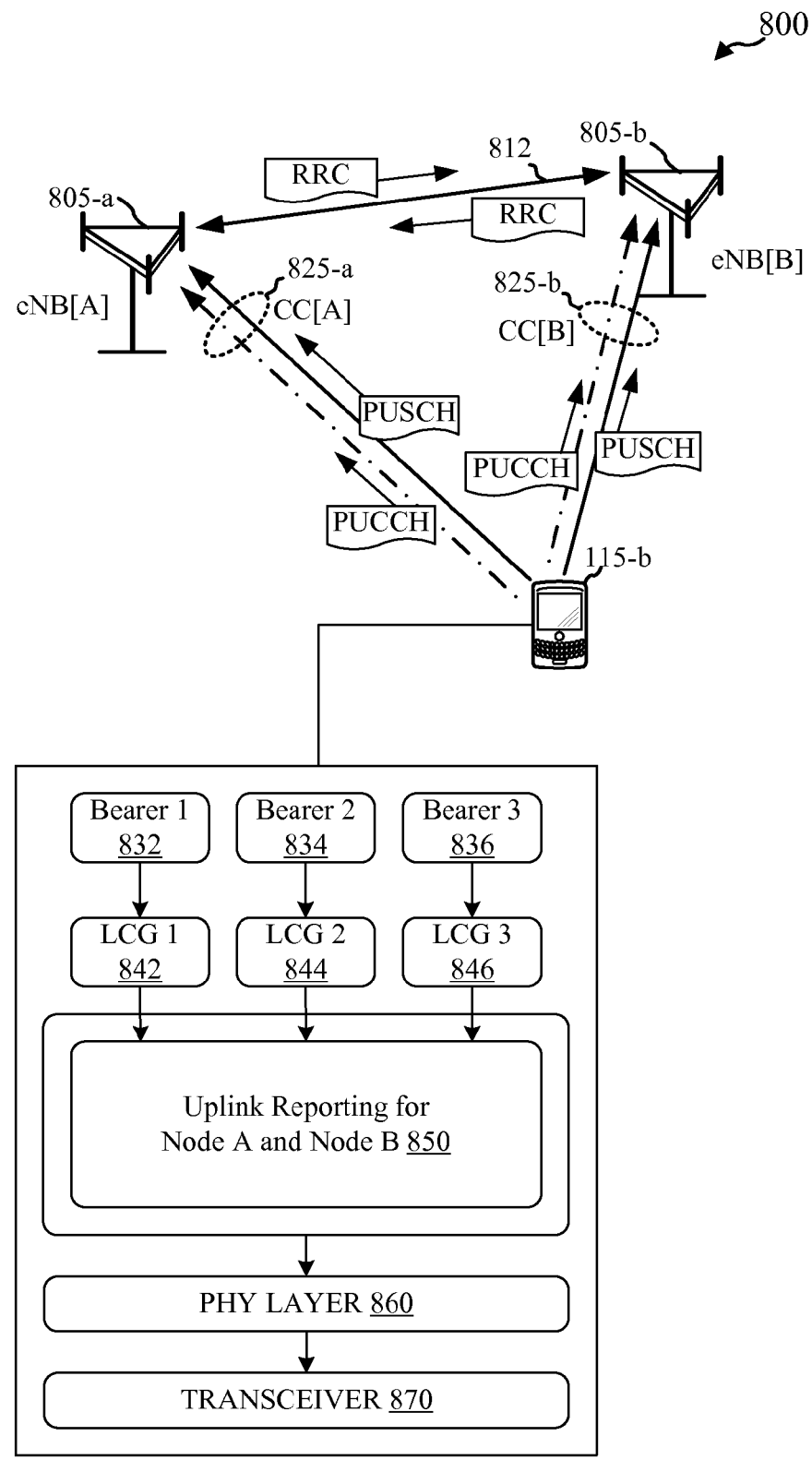
FIG. 8 illustrates a wireless communications system for multiflow uplink communications using packet level splitting in accordance with various embodiments.

FIG. 8 illustrates a wireless communications system 800 for multiflow uplink communications using packet level splitting in accordance with various embodiments. In wireless communications system 800, UE 115-b maintains (e.g., via transceiver 870, etc.) multiple concurrent uplink component carriers with multiple eNBs. In FIG. 8, UE 115-b communicates with eNB[A] 805-a over uplink component carrier CC[A] 825-a and with eNB[B] 805-b over uplink component carrier CC[B] 825-b. According to the architecture of FIG. 8, eNB[A] 805-a may be the PCell for UE 115-b while eNB[B] 805-b may be an SCell. UE 115-b may also be configured to receive multiple downlink component carriers from eNB[A], eNB[B], and/or other eNBs. eNB[A] 805-a may communicate with eNB[B] 805-b over a backhaul link 812, which may be a wireline or wireless backhaul link. While FIG. 8 illustrates UE 115-b in communication with two eNBs using two component carriers, packet level splitting may be used when UE 115-b is in multiflow operation with any number of eNBs.

UE 115-b may have multiple bearers (e.g., bearers 832, 834, 836) where each bearer is associated with a set of Quality of Service (QoS) requirements. Bearers support sessions of the UE 115-b (e.g., applications, services, etc.) and may support multiple packet flows to multiple sessions. Bearers with the same needs may be grouped into logical channel groups (LCGs). That is, logical channel groups may include one or more logical channels. Each logical channel group may be associated with a logical channel ID (LCID). When the sessions generate data (e.g., IP packets) and the data is formatted into Bearer SDUs (e.g., Packet Data Convergence Protocol (PDCP) SDUs, etc.) the bearer SDUs are input into buffers associated with the LCGs.

Logical channel IDs may be assigned to LCGs using common mapping or exclusive mapping. The MAC layer may manage logical channel ID mapping between the logical channel groups and the physical layer 860 to direct uplink and downlink data from LCGs at the RLC and/or PDCP sublayers with the same logical channel ID to and from the appropriate eNB and/or component carrier resources at the physical layer 860.

For packet level splitting embodiments, UEs group buffers for all LCGs into a common pool for uplink reporting 850. As data arrives in the LCG buffers, the UE triggers uplink reporting based on the amount of data in the common pool of buffers. The uplink reporting may be transmitted to each eNB scheduler over the component carriers associated with each eNB or over one component carrier to a primary eNB for distribution by the primary eNB the to the other eNBs configured to receive uplink data from the UE.

Figure 9A:
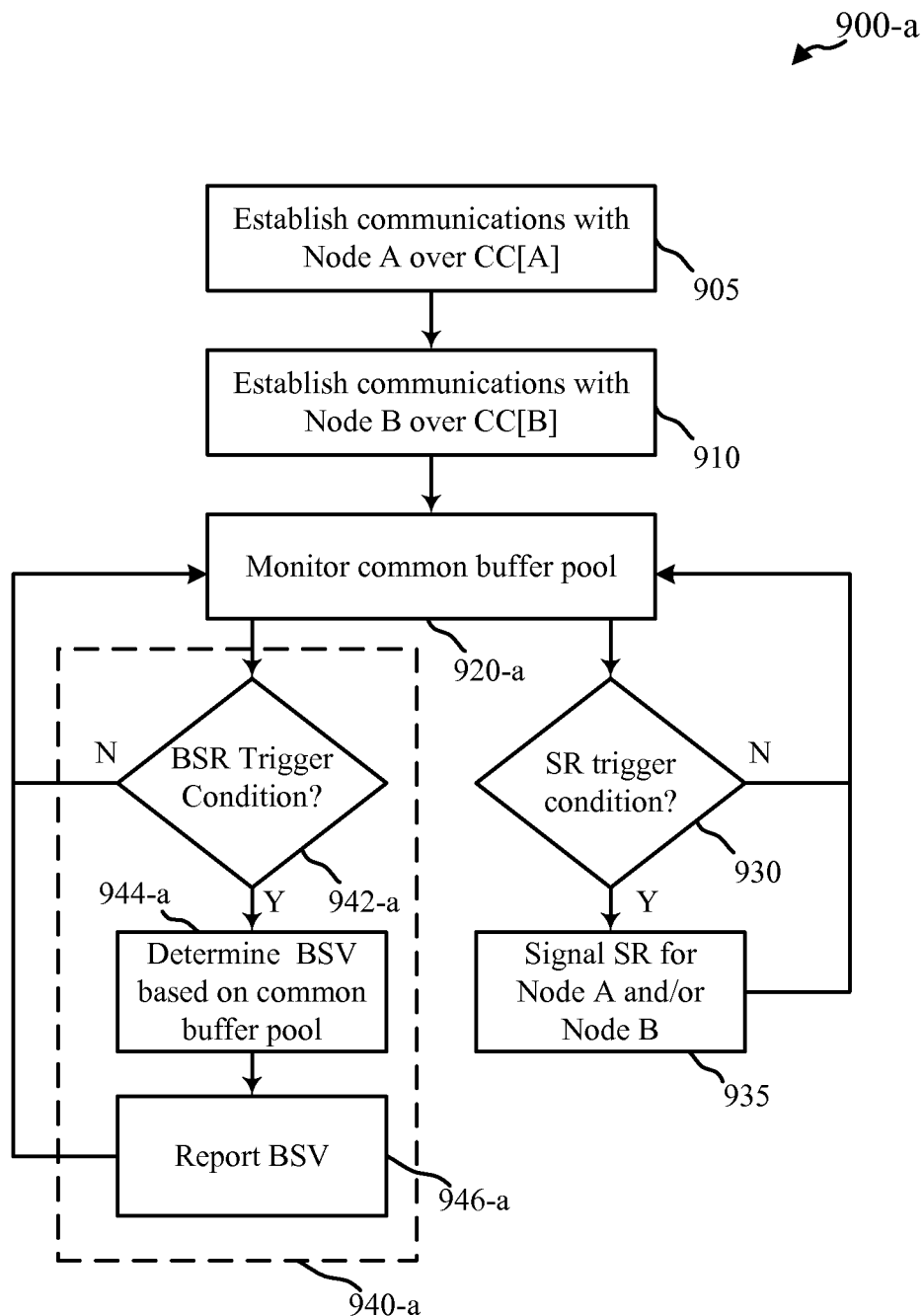
FIG. 9A illustrates a method for uplink reporting using packet level splitting in accordance with various embodiments.

In some packet level splitting embodiments, the UE may report buffer status values to the eNBs based on the total amount of data available for transmission in the common buffer pool for reporting buffer status. FIG. 9A illustrates a method 900-a for uplink reporting using packet level splitting in accordance with various embodiments. Method 900-a may be performed, for example, by UE 115-b illustrated in FIG. 8.

At block 905, a connection may be established between UE 115-b and eNB[A] 805-a over component carrier A 825-a. At block 910, a connection may be established between UE 115-b and eNB[B] 805-b over component carrier B 825-b. Component carriers A and B may be configured and maintained for UE 115-b to utilize either component carrier A, or component carrier B, or both of component carriers A and B concurrently for uplink transmissions.

At block 920-a, UE 115-b may monitor the common buffer pool that includes uplink data in the buffers for LCGs 842, 844, and 846. If a condition for sending a scheduling request is triggered at block 930, the UE 115-b may send SR on allocated resources to eNB[A] 805-a and/or eNB[B] 805-b at block 935. For example, if new data is available in the common buffer pool and the UE 115-b has no scheduled uplink resources (e.g., PUSCH, etc.) for transmitting the data but has valid PUCCH resources configured for SR on CC[A] 825-a and/or CC[B] 825-b, the UE 115-b may signal SR on the configured SR resources for CC[A] 825-a and/or CC[B] 825-b.

In embodiments, a single configuration for SR resources is applicable for each eNB. For example, SR resources may be configured for eNB[A] 805-a and eNB[B] 805-b using corresponding resources (e.g., same TTI and/or resource elements, etc.) of PUCCH channels for CC[A] 825-a and CC[B] 825-b. In embodiments, SR resources are independently configured across cells. In these embodiments, configured SR resources for CC[A] 825-a may be staggered in time (e.g., different TTI and/or orthogonal resource elements, etc.) relative to configured SR resources for CC[B] 825-b.

In embodiments, the number of eNBs for which the UE requests uplink resources and/or reports BSR may depend on the amount of available data. For example, if the UE 115-b has new data in the buffer pool and no scheduled uplink resources, the UE 115-b may determine whether to request uplink resources from one of eNB[A] 805-a or eNB[B] 805-b, or both eNB[A] 805 and eNB[B] 805-b, for transmission of the new data. UE 115-b may compare the amount of data in the buffer pool with a threshold and request resources from one cell (e.g., PCell eNB[A] 805-a) when the amount of data is below the threshold and more than one cell (e.g., the PCell and one or more SCells) when the amount of data is equal to or above the threshold. If the amount of data is below the threshold, UE 115-b may transmit a scheduling request to eNB[A] 805-a, receive uplink grants from eNB[A] 805-a on CC[A] 825-a, and transmit data using the uplink grants for CC[A] 825-a. UE 115-b may continue to perform uplink reporting (e.g., report BSR) to eNB[A] 805-a based on the amount of data in the buffer pool. If the amount of data in the buffer pool subsequently becomes equal to or greater than the threshold, UE 115-b may request uplink resources from eNB [B] 805-b. When uplink grants are available on both CC[A] 825-a and CC[B] 825-b, UE 115-b may report BSR to both eNB[A] 805-a and eNB[B] 805-b using the techniques described below.

While performing uplink reporting for multiple cells, UE 115-b may continue to compare the amount of available data in the buffer with the threshold. For example, if the amount of data in the buffer pool falls below the threshold, UE 115-*b* may discontinue BSR (or report BSR with a buffer size of zero) to one or more of the cells (e.g., SCell eNB[B] 805-*b*, etc.). Using these techniques, uplink transmissions may be scheduled by multiple cells when the amount of buffer data is relatively high, providing a higher achievable uplink rate using multiflow transmissions. If the data flow into the buffer pool was relatively high but then drops rapidly, the buffers may empty while uplink grants are still scheduled for one or more cells. In this instance, the UE may report BSR with a buffer size of zero and the overhead impact may be relatively small compared with the achievable data rate. Where the amount of available data is low, performing uplink reporting for multiple cells may cause over-scheduling of resources and discontinuing BSR for one or more of the cells reduces overhead losses.

Method 900-*a* performs buffer status reporting in block 940-*a*. If a BSR trigger condition is detected at block 942-*a*, UE 115-*b* may determine a buffer status value based on the total amount of data across all LCGs in the buffer pool at block 944-*a*. The UE 115-*b* may report the buffer status value to eNB[A] 805-*a* and/or eNB[B] 805-*b* at block 946-*a*. UE 115-*b* may report the actual buffer status value at the time of BSR transmission to each cell or UE 115-*b* may report to all cells the buffer status value at the time of the last BSR transmission to the first cell, as described below.

Figure 9B:
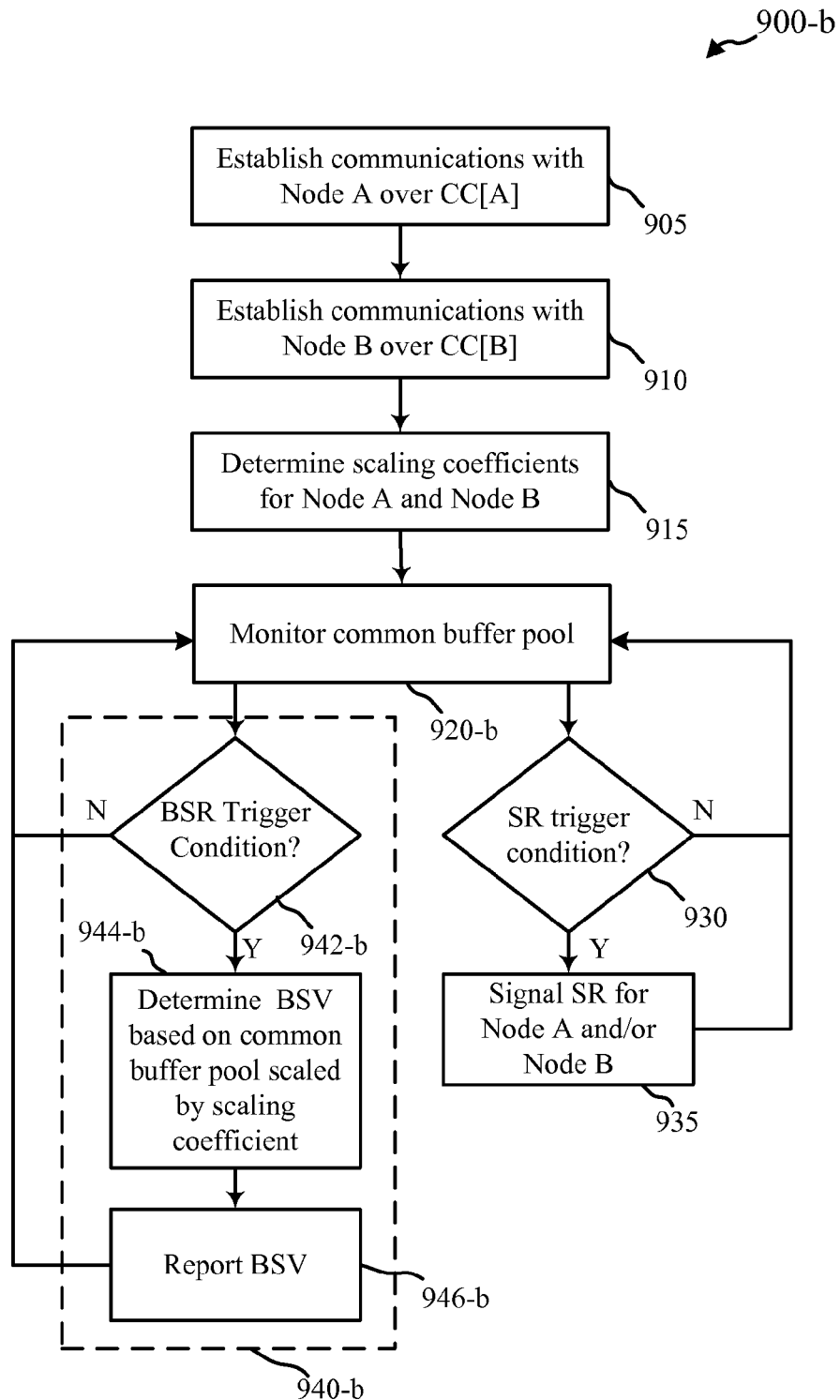
FIG. 9B illustrates a method for uplink reporting using scaling coefficients for packet level splitting in accordance with various embodiments.

In some packet level splitting embodiments, scaling coefficients may be determined for each eNB and the buffer status values reported to the eNBs may be based on the total amount of data available for transmission in the common buffer pool scaled by the respective coefficients. FIG. 9B illustrates a method 900-*b* for uplink reporting using scaling coefficients for packet level splitting in accordance with various embodiments. Method 900-*b* may be performed, for example, by UE 115-*b* illustrated in FIG. 8.

Consider that UE 115-*b* establishes connections to eNB[A] 805-*a* and eNB[B] 805-*b* in blocks 905 and 910 as described with reference to FIG. 9A. At block 915, scaling coefficients may be determined for uplink reporting from UE 115-*b*. For example, scaling coefficients α and β may be determined for eNB[A] 805-*a* and eNB[B] 805-*b*, respectively. In some embodiments, the scaling coefficients may be determined by the eNBs. For example, eNBs that have established component carriers for uplink transmission from a UE may negotiate or exchange a service ratio (or service ratio matrix) for servicing uplink transmissions from the UE. The eNBs may determine the service ratio based on loading of the eNBs and/or other factors. The eNBs may send the scaling coefficients to the UE via RRC configuration. In some embodiments, UE 115-*b* may determine the scaling coefficients α and β. For these embodiments, the UE 115-*b* may or may not send the scaling coefficients to the eNBs. For example, the UE 115-*b* may determine the scaling coefficients and report buffer status values to the respective eNBs based on the amount of data in the buffer pool scaled by the scaling coefficients. The eNBs may schedule resources based on the reported buffer status values.

Method 900-*b* performs buffer status reporting in block 940-*b*. If a BSR trigger condition is detected at block 942-*b*, UE 115-*a* may determine a buffer status value for reporting at block 944-*b*. The reported buffer status value may be determined based on the total amount of data across all LCGs in the buffer pool scaled by the scaling coefficient for the eNB for which the buffer status is to be reported. For example, if BSR is triggered the UE 115-*b* may determine a buffer status value for eNB[A] 805-*a* based on the total data in the buffer pool scaled by scaling coefficient α and a buffer status value for eNB[B] 805-*b* based on the total data in the buffer pool scaled by scaling coefficient β. The UE 115-*b* may report the buffer status values to eNB[A] 805-*a* and/or eNB[B] 805-*b* at block 946-*b*. The UE 115-*b* may report the actual buffer status value at the time of BSR transmission to each cell or the UE 115-*b* may report buffer status to all cells based on the total available data at the time of the BSR transmission to the first cell, as described below.

In some embodiments, uplink scaling coefficients may be determined independently for each LCG. Referring back to FIG. 8 for example, scaling coefficients $\alpha_1$, $\alpha_2$, and $\alpha_3$ may be determined for LCG[1] 842, LCG[2] 844, and LCG[3] 846, respectively. For these embodiments, the reported buffer status value for eNB[A] 805-*a* may be determined for an arbitrary number N of LCGs based on a buffer size (BUFSIZE [A]) calculated according to the formula:

$$BUFSIZE[A] = \sum_{i=1}^{N} \alpha_i * BUFSIZE_{LCG[i]}$$

Similarly, scaling coefficients $\beta_1$, $\beta_2$, and $\beta_3$ may be determined for LCG[1] 842, LCG[2] 844, and LCG[3] 846, respectively. The reported buffer status value for eNB[B] 805-*b* may be may be determined for an arbitrary number N of LCGs based on a buffer size (BUFSIZE[B]) calculated according to the formula:

$$BUFSIZE[B] = \sum_{i=1}^{N} \beta_i * BUFSIZE_{LCG[i]}$$

Where LCG specific scaling coefficients are used in packet level splitting embodiments, the LCG specific coefficients can be utilized in mapping of packets from logical channel groups to uplink grant resources. For example, packets from an LCG buffer may be assigned to component carriers and/or eNBs based on the scaling coefficients for the LCG.

Figure 10A:
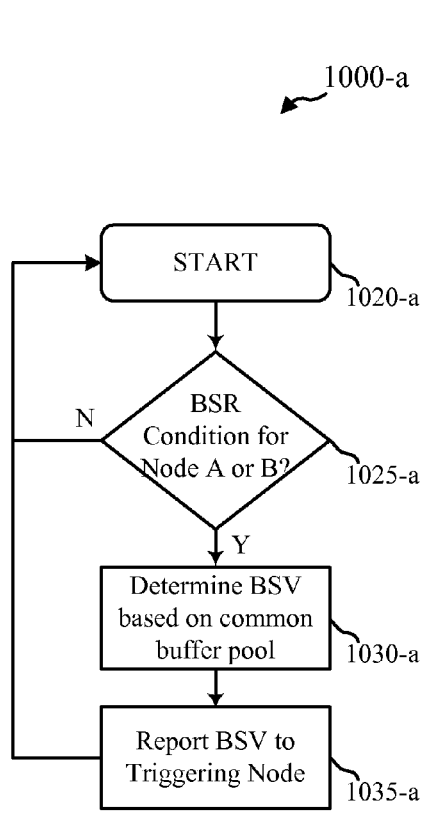
FIG. 10A illustrates a method for reporting buffer status based on the actual amount of data in the buffer pool in accordance with various embodiments.

In some embodiments, reported buffer status values to each cell may correspond to an actual amount of data in the buffer pool at the time of reporting the buffer status. FIG. 10A illustrates a method 1000-*a* for reporting buffer status based on the actual amount of data in the buffer pool in accordance with various embodiments. Method 1000-*a* may be performed by UE 115-*b* as illustrated in FIG. 8 and may illustrate embodiments for buffer status reporting 940-*a* of method 900-*a* and/or buffer status reporting 940-*b* of method 900-*b*.

Method 1000-*a* starts at block 1020-*a* when buffer status reporting for an eNB is triggered. Buffer status reporting may be triggered by a timer or other conditions (e.g., padding BSR, etc.). In embodiments, UE 115-*b* maintains separate timers for each eNB. For example, UE 115-*b* may maintain separate retxBSR and periodicBSR timers for eNB[A] 805-*a* and eNB[B] 805-*b*.

At block 1025-*a*, UE 115-*b* may determine whether BSR is triggered for eNB[A] and/or eNB[B]. At block 1030-*a*, UE 115-*b* determines a buffer status value based on the amount of data in the buffer pool left to be transmitted (e.g., after accounting for data to be transmitted in currently scheduled uplink grants). The buffer status value may be determined based on the total amount of data or a scaled total amount of data as described above. At block 1035-*a*, the determined buffer status value is reported to the eNB associated with the BSR trigger determined at block 1125-*a*.

When buffer status reporting is triggered for another eNB at a subsequent time, the UE 115-*b* starts method 1000-*a* again at block 1020-*a*. Thus, the UE 115-*b* determines and reports an updated buffer status value based on the new amount of data in the buffer pool (e.g., lower amount of data if some has been transmitted between BSRs or higher amount of data if additional packets have come into the buffers between BSRs, etc.).

Figure 10B:
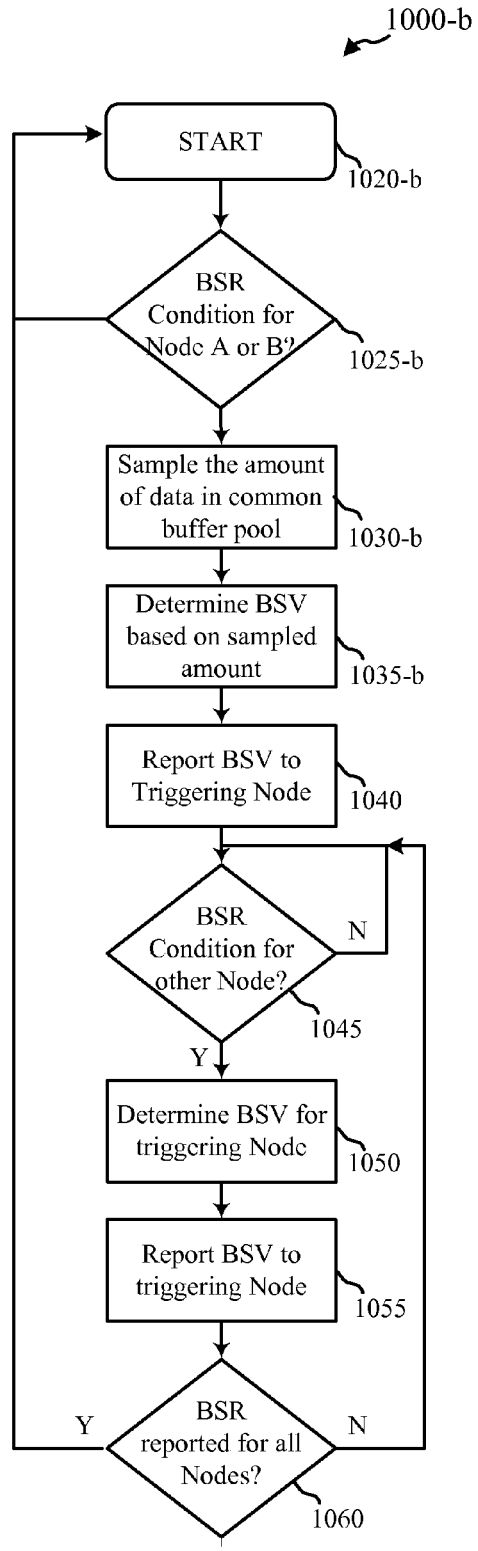
FIG. 10B illustrates a method for reporting buffer status to each node based on the amount of data in the buffer pool at the time of a first BSR trigger in accordance with various embodiments.

In some embodiments, the UE may report buffer status to each cell based on an amount of data in the buffer pool at the time of BSR triggering for one of the cells. FIG. 10B illustrates a method 1000-*b* for reporting buffer status to each cell based on the amount of data in the buffer pool at the time of a first BSR trigger in accordance with various embodiments. Method 1000-*b* may be performed by UE 115-*b* as illustrated in FIG. 8 and may illustrate embodiments for buffer status reporting 940-*a* of method 900-*a* and/or buffer status reporting 940-*b* of method 900-*b*.

Method 1000-*b* starts at block 1020-*b* when buffer status reporting for an eNB is triggered. Buffer status reporting may be triggered by a timer or other conditions (e.g., padding BSR, etc.). At block 1025-*b*, UE 115-*b* may determine whether BSR is triggered for eNB[A] 805-*a* and/or eNB[B] 805-*b*. At block 1030-*b*, UE 115-*b* may determine the amount of available data for uplink transmission in the common buffer pool and store the amount of data for use in buffer reporting for all eNBs.

At block 1035-*b*, UE 115-*b* may determine a buffer status value for the triggering eNB. UE 115-*b* may use any of the techniques described above (e.g., reporting based on the total data, reporting using scaling coefficients, etc.) for determining the buffer status value for the triggering eNB. At block 1040, UE 115-*b* may report the buffer status value to the triggering eNB.

At block 1045, UE 115-*b* may determine that a BSR triggering event or transmission opportunity (e.g., periodic BSR, padding BSR, etc.) has occurred for another eNB. At block 1050, UE 115-*b* may determine a buffer status value for the triggering eNB based on the stored amount of data from block 1030-*b*. UE 115-*b* may report the buffer status value to the triggering eNB at block 1055.

At block 1060, UE 115-*b* determines if BSR has been reported to all eNBs based on the stored amount of data from block 1030-*b*. When UE 115-*b* has reported BSR based on the stored amount of data to all eNBs, method 1000-*b* returns to block 1020-*b* and continues to monitor the buffer pool for BSR triggering conditions. Otherwise, method 1000-*b* waits for BSR conditions for the eNBs for which BSR has not been reported at block 1045.

In embodiments, UE 115-*b* maintains separate timers for each eNB. For example, UE 115-*b* may maintain separate retxBSR and periodicBSR timers for eNB[A] 805-*a* and eNB [B] 805-*b*. In some embodiments, UE 115-*b* maintains a common set of timers for BSR reporting for all eNBs. BSR triggered for the first eNB at block 1025-*b* may trigger BSRs for all cells at block 1045. For example, where a common set of timers is used, expiration of a common BSR timer at block 1025-*b* may trigger BSRs for all cells at block 1045.

Figure 11:
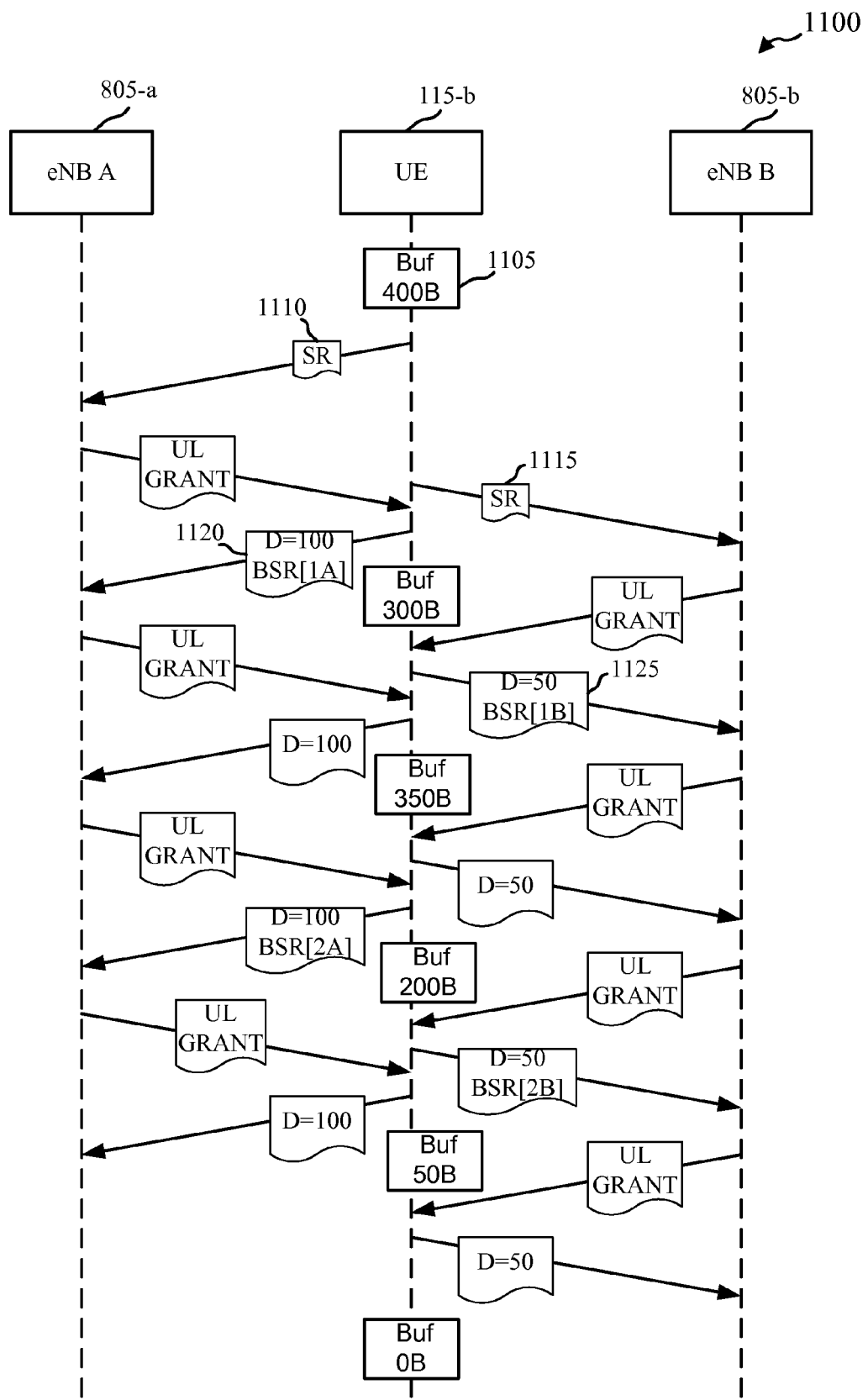
FIG. 11 shows a flow diagram illustrating an example of multiflow operation between a UE and multiple nodes in accordance with various embodiments.

FIG. 11 shows a flow diagram 1100 illustrating an example of multiflow operation between UE 115-*b* and multiple cells in accordance with various embodiments. In flow diagram 1100, UE 115-*b* maintains uplink component carrier CC[A] 825-*a* for communication with eNB[A] 805-*a* and uplink component carrier CC [B] 825-*b* for communication with eNB[B] 805-*b*.

Prior to block 1105, UE 115-*b* may not have uplink resources granted by either eNB[A] 805-*a* or eNB[B] 805-*b*. At block 1105, data may become available for uplink transmission by one or more LCGs of UE 115-*b*. In flow diagram 1100, 400 bytes of data become available for uplink transmission at block 1105.

UE 115-*b* signals a scheduling request 1110 to eNB[A] 805-*a* requesting resources for uplink transmission. Scheduling request 1110 may be transmitted using resources of CC[A] 825-*a* configured for scheduling requests of UE 115-*b* by eNB[A] 805-*a*. UE 115-*b* also signals a scheduling request 1115 to eNB[B] 805-*b* requesting resources for uplink transmission. Scheduling request 1115 may be transmitted using resources of CC[B] 825-*b* configured for scheduling requests of UE 115-*b* by eNB[B] 805-*b*. As described above, transmission opportunities for scheduling requests 1110 and 1115 may be allocated in corresponding resource elements or in orthogonal resources. Where a single carrier may be used for uplink scheduling for multiple cells in multiflow operation, scheduling requests 1110 and 1115 may be transmitted using resources of the same component carrier (e.g., CC[A] 825-*a* or CC[B] 825-*b*.

UE 115-*b* may receive an uplink grant from eNB[A] 805-*a* in response to the scheduling request 1110. UE 115-*b* may transmit a portion of the available data in the uplink grant 1120. In the illustrated example, UE 115-*b* transmits 100 bytes. In the uplink grant 1120, UE 115-*b* also reports buffer status in BSR[1A] to eNB[A] 805-*a*.

UE 115-*b* may receive an uplink grant from eNB[B] 805-*b* in response to the scheduling request 1115. UE 115-*b* may transmit another portion of the available data in the uplink grant 1125. In the illustrated example, UE 115-*b* transmits 50 bytes in uplink grant 1125. In the uplink grant 1125, UE 115-*b* also reports buffer status in BSR[1B] to eNB[B] 805-*b*. As described above, BSR[1B] may be based on the amount of data in the buffer pool at the time of reporting of the buffer status to eNB[A] 805-*a*, or BSR[1B] may be based on the actual amount of data in the buffer pool at the time of reporting BSR[1B] to eNB[B]. As described above, buffer status values reported in BSR[1A] and/or BSR[1B] may be based on the total amount of data in the buffer pool, or the total amount of data in the buffer pool scaled by scaling coefficients associated with each eNB or scaling coefficients associated with each LCG and each eNB.

Figure 12A:
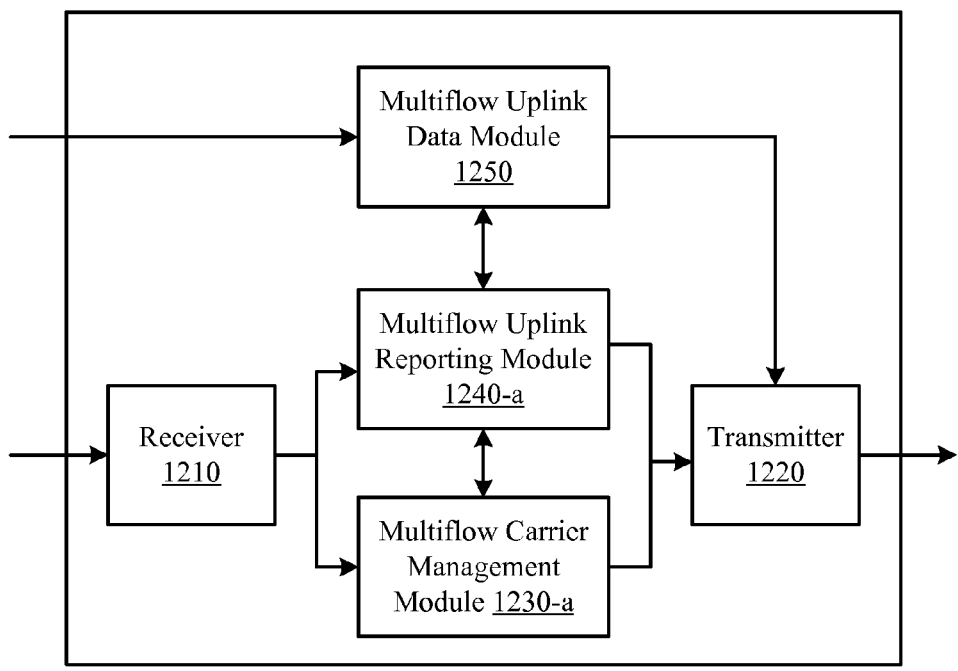
FIG. 12A is a block diagram that illustrates a device for uplink reporting in multiflow operation in accordance with various embodiments.

FIG. 12A is a block diagram that illustrates a device 1200-*a* for uplink reporting in multiflow operation in accordance with various embodiments. The device 1200-*a* may be an example of one or more aspects of user equipment 115 described with reference to FIG. 1, FIG. 2, FIG. 6, FIG. 8, FIG. 13, and/or FIG. 15. The device 1200-*a* may also be a processor. The device 1200-*a* may include a receiver module 1210, a transmitter module 1220, a multiflow carrier management module 1230-*a*, a multiflow uplink reporting module 1240-*a*, and/or a multiflow uplink data module 1250. Each of these components may be in communication with each other.

Multiflow carrier management module 1230-*a* may establish and maintain (via receiver 1210 and transmitter 1220) multiple communication links with multiple cells concurrently. For example, multiflow carrier management module 1230-*a* may be configured to manage communications with multiple eNBs over multiple independent component carriers at the same time. Each component carrier may include a physical uplink shared channel for uplink data communications and/or a physical uplink control channel for uplink device and/or channel resource configuration information. In one embodiment, multiflow carrier management module 1230-*a* establishes multiple uplink component carriers for substantially concurrent communication with multiple eNBs, where each uplink component carrier includes a physical uplink control channel for communication of configuration information between the device 1200-*a* and an eNB 105.

Multiflow uplink data module 1250 may manage data flow for the multiple communication links. For example, multiflow uplink data module 1250 may determine a set of bearers and/or logical channel groups having data available for uplink transmission and communicate information associated with uplink data to multiflow uplink reporting module 1240-*a*. Multiflow uplink data module 1250 may manage (via transmitter 1220) data flow between logical channel groups and the eNBs over the established component carriers.

Multiflow uplink reporting module 1240-*a* may perform uplink reporting for the multiple communication links. In embodiments, multiflow uplink reporting module 1240-*a* manages SR and/or BSR for the multiple communication links using the techniques described above with reference to FIG. 6, FIG. 7, FIG. 8, FIG. 9A, FIG. 9B, FIG. 10A, and/or FIG. 10B. For example, multiflow uplink reporting module 1240-*a* may perform uplink reporting using bearer level splitting and/or packet level splitting techniques as described above.

Figure 12B:
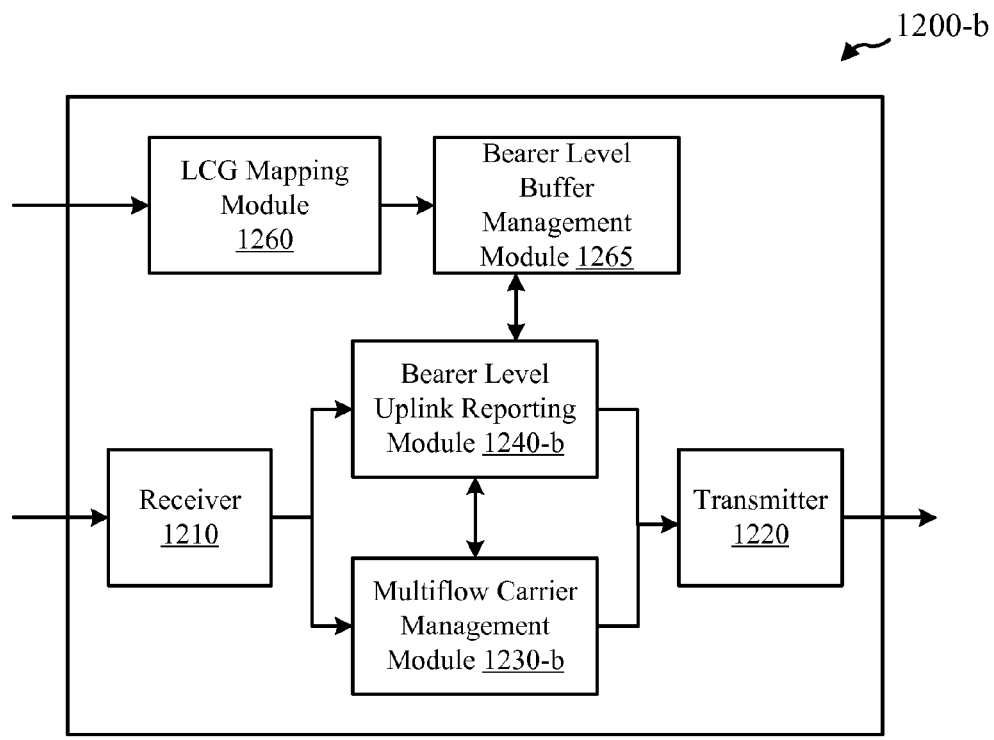
FIG. 12B is a block diagram that illustrates a device for uplink reporting in multiflow operation using bearer level splitting in accordance with various embodiments.

FIG. 12B is a block diagram that illustrates a device 1200-*b* for uplink reporting in multiflow operation using bearer level splitting in accordance with various embodiments. The device 1200-*b* may be an example of one or more aspects of user equipment 115 described with reference to FIG. 1, FIG. 2, FIG. 6, FIG. 8, FIG. 13, and/or FIG. 15. The device 1200-*b* may also be a processor. The device 1200-*b* may include a receiver module 1210, a transmitter module 1220, a multiflow carrier management module 1230-*b*, a bearer level uplink reporting module 1240-*b*, a logical channel group mapping module 1260, and/or a mapped logical channel group buffer management module 1265. Functions of receiver 1210, transmitter 1220, and/or multiflow carrier management module 1230-*b* may be substantially equivalent to the corresponding modules of FIG. 12A and may not be repeated here for the sake of brevity. Each of these components may be in communication with each other.

Logical channel group mapping module 1260 may associate one or more logical channel groups with each of multiple component carriers and/or multiple eNBs for transmission of uplink data. For example, a UE 115 may have a set of logical channel groups used for communication of uplink data between the UE 115 and multiple eNBs over multiple component carriers. Each logical channel group may have an associated logical channel group ID. Each component carrier may have a physical uplink shared channel established by the multiflow carrier management module 1230-*b*. Logical channel group mapping module 1260 may associate one subset of the set of logical channel groups with one of the multiple eNBs and another, different subset of the set of logical channel groups with a different one of the multiple eNBs. Logical channel group mapping module 1260 may manage uplink data for the subsets of logical channel groups by mapping data from each subset of the logical channel groups to the appropriate physical uplink channel. Logical channel group mapping module 1260 may manage uplink data mapping with common logical channel ID mapping or exclusive logical channel ID mapping, as described above.

Mapped logical channel group buffer management module 1265 may monitor uplink data buffers for the set of logical channel groups. Logical channel group buffer management module 1265 may communicate the amount of available data in each of the logical channel group buffers to the bearer level uplink reporting module 1240-*b* for uplink reporting.

Bearer level uplink reporting module 1240-*b* may perform uplink reporting independently for each subset of logical channel groups to each associated eNB. For example, bearer level uplink reporting module 1240-*b* may signal SR and report BSR to each eNB based on data available for uplink transmission in the logical channel group buffers associated with each eNB.

Figure 12C:
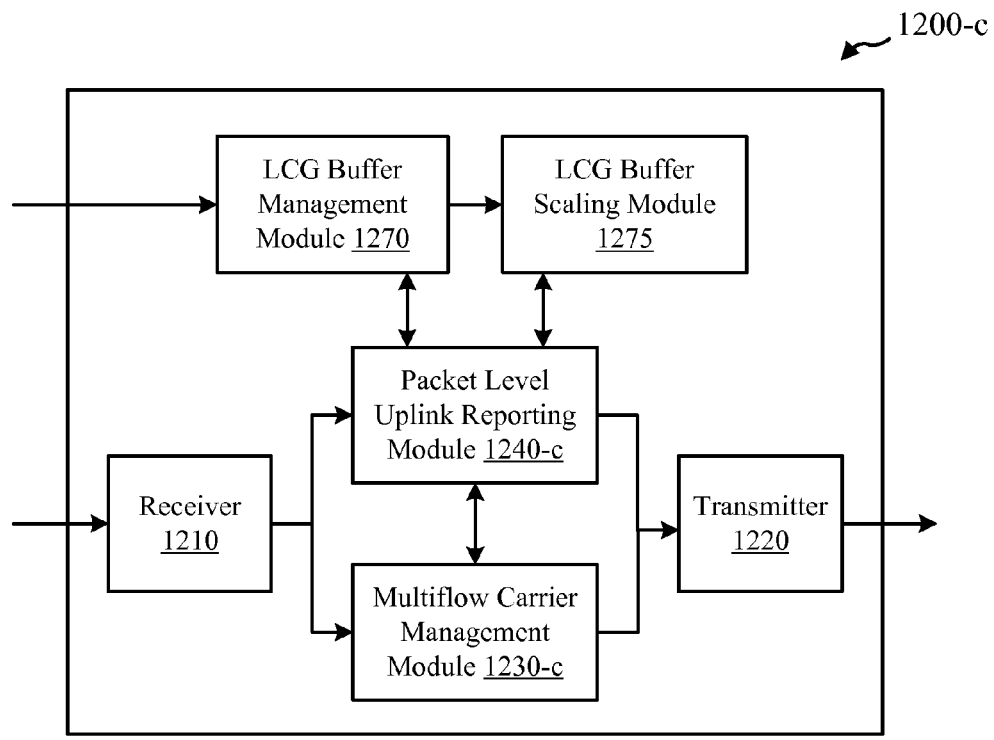
FIG. 12C is a block diagram that illustrates a device for uplink reporting in multiflow operation using packet level splitting in accordance with various embodiments.

FIG. 12C is a block diagram that illustrates a device 1200-*c* for uplink reporting in multiflow operation using packet level splitting in accordance with various embodiments. The device 1200-*c* may be an example of one or more aspects of user equipment 115 described with reference to FIG. 1, FIG. 2, FIG. 6, FIG. 8, FIG. 13, and/or FIG. 15. The device 1200-*c* may also be a processor. The device 1200-*c* may include a receiver module 1210, a transmitter module 1220, a multiflow carrier management module 1230-*c*, a packet level uplink reporting module 1240-*c*, a logical channel group buffer management module 1270, and/or a logical channel group buffer scaling module 1275. Functions of receiver 1210, transmitter 1220, and/or multiflow carrier management module 1230-*c* may be substantially equivalent to the corresponding modules of FIG. 12A and may not be repeated here for the sake of brevity. Each of these components may be in communication with each other.

Logical channel group buffer management module 1270 may manage data from logical channel groups across multiple communication links with multiple eNBs. For example, logical channel group buffer management module 1270 may manage uplink data from logical channel groups as a common pool of uplink data for transmission from the UE using multiflow operation. Logical channel group buffer scaling module 1275 may determine and/or manage scaling coefficients for uplink reporting for multiple concurrent communication links. For example, logical channel group buffer scaling module 1275 may determine BSR scaling coefficients for reporting the amount of data in the common buffer pool to each of multiple eNBs. Logical channel group buffer scaling module 1275 may apply the scaling coefficients to determine buffer status values for reporting BSR to each of the multiple eNBs. In embodiments, logical channel group buffer scaling module 1275 determines and/or manages BSR scaling coefficients for each LCG individually Packet level uplink reporting module 1240-*c* may perform SR and BSR for the multiple communication links. For example, packet level uplink reporting module 1240-*c* may signal SR and perform BSR for each of multiple eNBs. Packet level uplink reporting module 1240-*c* may report BSR based on the actual amount of data in the common buffer pool at the time of BSR transmission to each cell or the packet level uplink reporting module 1240-*c* may report BSR to each cell based on the amount of data in the common buffer pool at the time of the last BSR transmission to the first cell.

Figure 13:
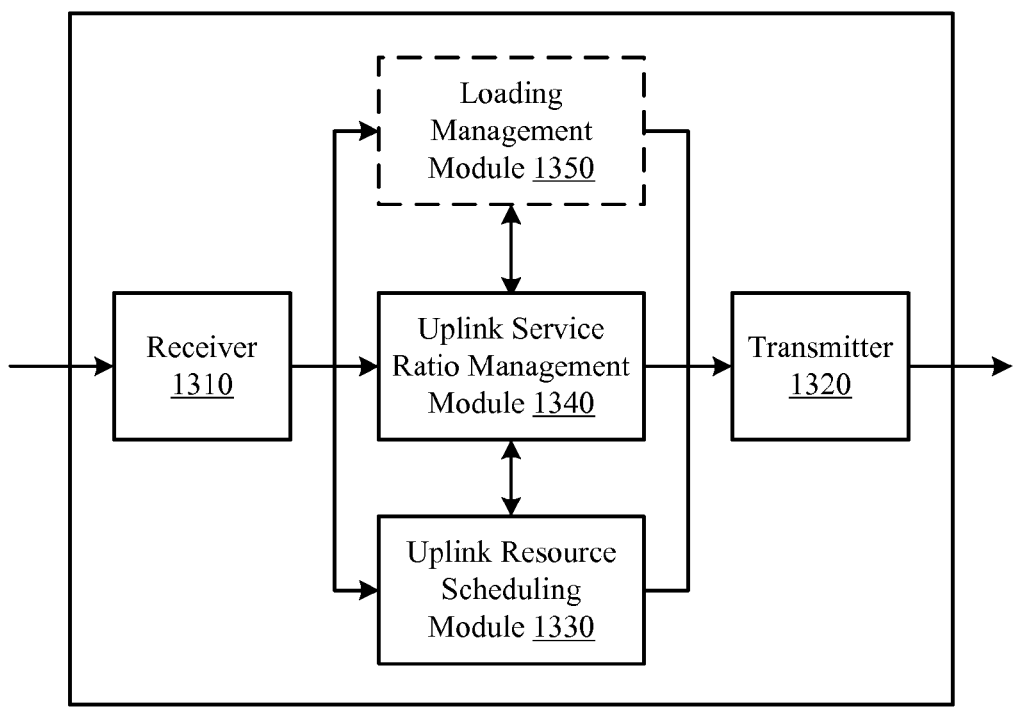
FIG. 13 is a block diagram that illustrates a device for managing uplink resources in multiflow operation in accordance with various embodiments.

FIG. 13 is a block diagram that illustrates a device 1300 for managing uplink resources in multiflow operation in accordance with various embodiments. The device 1300 may be an example of one or more aspects of eNBs 105 described with reference to FIG. 1, FIG. 2, FIG. 6, FIG. 8, FIG. 14, and/or FIG. 15. The device 1300 may also be a processor. The device 1300 may include receiver module 1310, transmitter 1320, uplink resource scheduling module 1330, uplink service ratio management module 1340, and/or loading management module 1350. Each of these components may be in communication with each other.

The uplink resource scheduling module 1330 may schedule resources of uplink component carriers used for communication between the device 1300 and UEs 115. The uplink service ratio management module 1340 may determine uplink service ratios for UEs in concurrent communication with the device 1300 and one or more other serving cells. The loading management module 1350 may determine loading of the device 1300 relative to other cells that may be serving some of the same UEs in multiflow operation.

In one example, the device 1300 may be serving a UE 115 for uplink communication. The UE 115 may be in concurrent uplink communication with another cell using multiflow operation. The uplink service ratio management module 1340 may determine an uplink service ratio that allocates a portion of uplink service of the UE 115 to the device 1300 and another portion of uplink service of the UE 115 to the other cell. The uplink service ratio management module 1340 may determine the uplink service ratio by negotiating or exchanging the service ratio with the other cell. The uplink service ratio may be dynamically adjusted based on the relative loading of the device 1300 and the other cell and relative channel conditions between the UE 115 and the device 1300 and the UE 115 and the other cell. The uplink service ratio management module 1340 may send scaling coefficients to the UE 115 for use in buffer status reporting to the device 1300 and the other cell.

The components of devices 1100, 1200-a, 1200-b, and/or 1300 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 14:
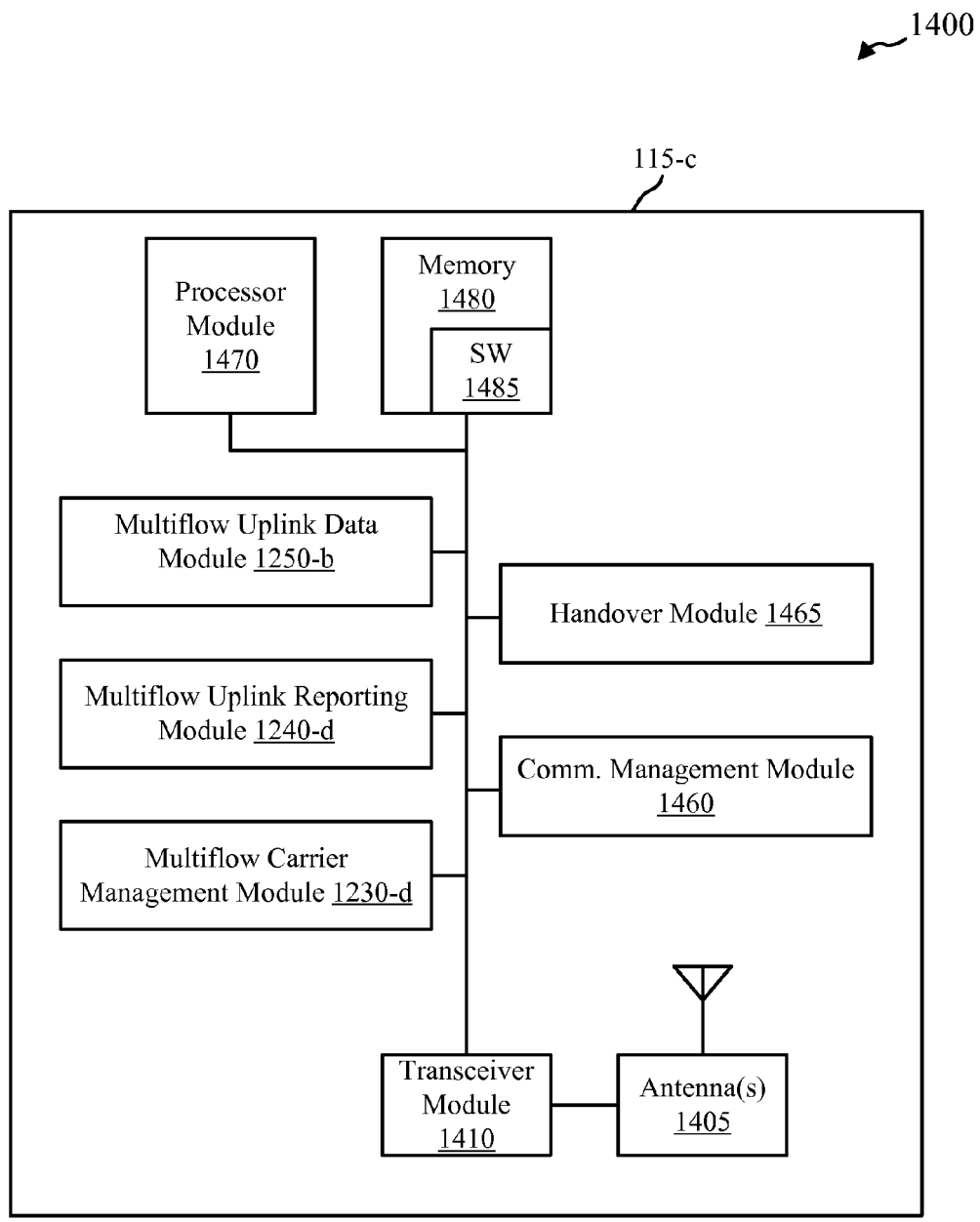
FIG. 14 is a block diagram of a mobile device configured for uplink reporting in multiflow operation in accordance with various embodiments.

FIG. 14 is a block diagram 1400 of a mobile device 115-c configured for uplink reporting in multiflow operation in accordance with various embodiments. The mobile device 115-c may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-c may have an internal power supply (not shown), such as a small battery, to facilitate mobile operation. In some embodiments, the mobile device 115-c may be the mobile devices 115 of FIG. 1, FIG. 2, FIG. 6, FIG. 8, FIG. 15, and/or FIG. 16.

The mobile device 115-c may generally include components for bi-directional voice and data communications including components for transmitting communications and components for receiving communications. The mobile device 115-c may include a transceiver module 1410, antenna(s) 1405, memory 1480, and a processor module 1470, which each may communicate, directly or indirectly, with each other (e.g., via one or more buses). The transceiver module 1410 is configured to communicate bi-directionally, via the antenna(s) 1405 and/or one or more wired or wireless links, with one or more networks, as described above. For example, the transceiver module 1410 may be configured to communicate bi-directionally with base stations 105 of FIG. 1. The transceiver module 1410 may include a modem configured to modulate the packets and provide the modulated packets to the antenna(s) 1405 for transmission, and to demodulate packets received from the antenna(s) 1405. While the mobile device 115-c may include a single antenna 1405, the mobile device 115-c may have multiple antennas 1405 capable of concurrently transmitting and/or receiving multiple wireless transmissions. The transceiver module 1410 may be capable of concurrently communicating with multiple eNBs via multiple component carriers.

The memory 1480 may include random access memory (RAM) and read-only memory (ROM). The memory 1480 may store computer-readable, computer-executable software/firmware code 1485 containing instructions that are configured to, when executed, cause the processor module 1470 to perform various functions described herein (e.g., call processing, database management, multiflow data processing, uplink reporting, etc.). Alternatively, the software/firmware code 1485 may not be directly executable by the processor module 1470 but be configured to cause a computer (e.g., when compiled and executed) to perform functions described herein.

The processor module 1470 may include an intelligent hardware device, e.g., a central processing unit (CPU) such as those made by Intel® Corporation or AMD®, a microcontroller, an application-specific integrated circuit (ASIC), etc. The mobile device 115-c may include a speech encoder (not shown) configured to receive audio via a microphone, convert the audio into packets (e.g., 20 ms in length, 30 ms in length, etc.) representative of the received audio, provide the audio packets to the transceiver module 1410, and provide indications of whether a user is speaking.

According to the architecture of FIG. 14, the mobile device 115-c may further include a communications management module 1460. The communications management module 1460 may manage communications with base stations 105. By way of example, the communications management module 1460 may be a component of the mobile device 115-c in communication with some or all of the other components of the mobile device 115-c via a bus. Alternatively, functionality of the communications management module 1460 may be implemented as a component of the transceiver module 1410, as a computer program product, and/or as one or more controller elements of the processor module 1470.

In some embodiments, a handover module 1465 may be utilized to perform handover procedures of the mobile device 115-c from one base station 105 to another. For example, the handover module 1465 may perform a handover procedure of the mobile device 115-c from one base station to another where voice and/or data communications are being received from the base stations.

The mobile device 115-c may be configured to perform uplink communications with multiple eNBs using multiflow operation. The components for mobile device 115-c may be configured to implement aspects discussed above with respect to devices 1200-a, 1200-b, and/or 1200-c of FIGS. 12A, 12B, and/or 12C and may not be repeated here for the sake of brevity. For example, the multiflow carrier management module 1230-d may be an example of one or more aspects of the multiflow carrier management modules 1230 of FIGS. 12A, 12B, and/or 12C, the multiflow uplink reporting module 1240-d may be an example of one or more aspects of the multiflow uplink reporting modules 1240 of FIGS. 12A, 12B, and/or 12C, and the multiflow uplink data module 1250-b may be an example of the multiflow uplink data module 1250-a of FIG. 12A.

Figure 15:
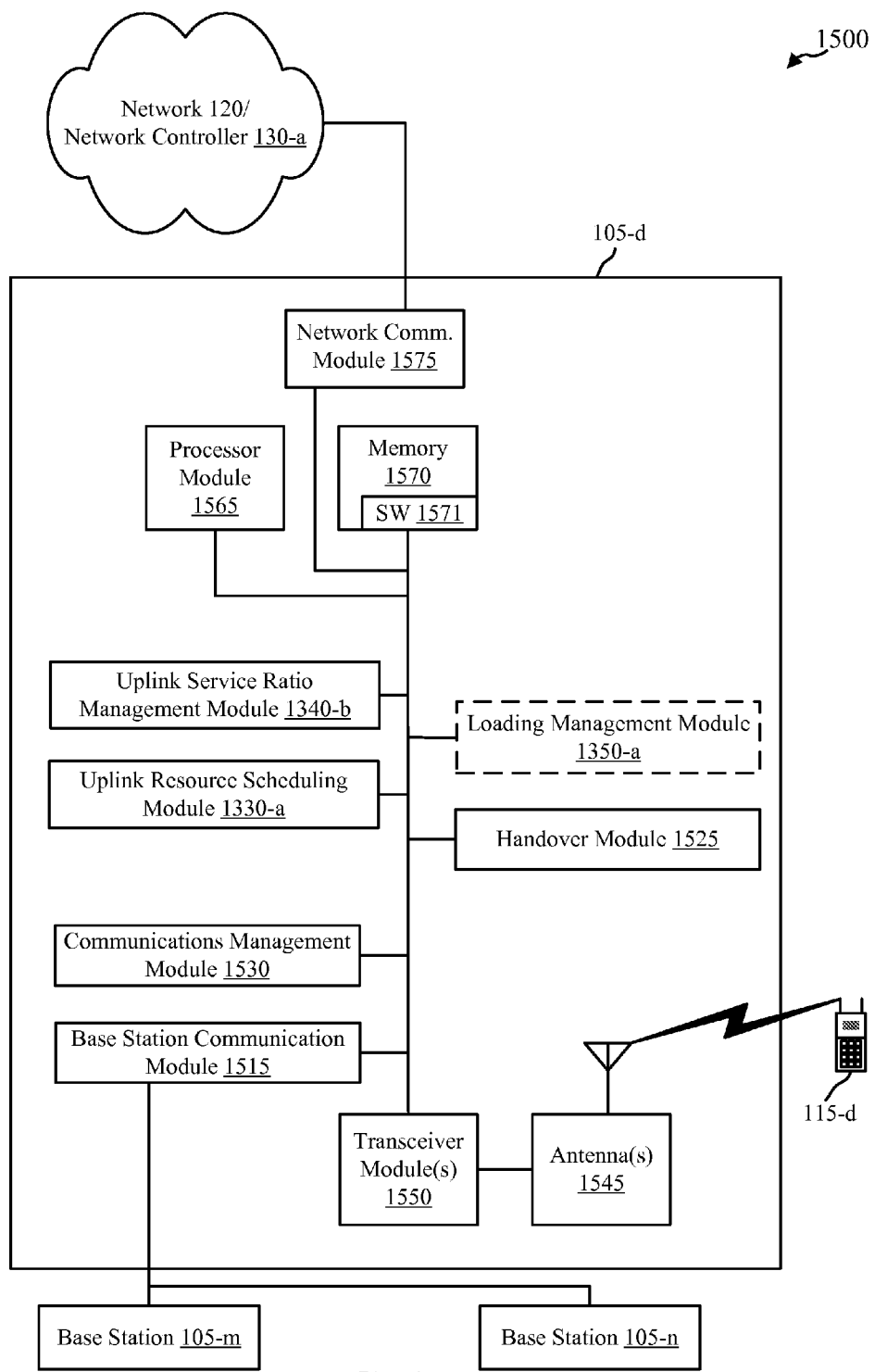
FIG. 15 shows a block diagram of a communications system that may be configured for uplink reporting in multiflow operation in accordance with various embodiments.

FIG. 15 shows a block diagram of a communications system 1500 that may be configured for uplink reporting in multiflow operation in accordance with various embodiments. This system 1500 may be an example of aspects of the system 100 depicted in FIG. 1, system 200 of FIG. 2, and/or system 1600 of FIG. 16. The base station 105-d may include antennas 1545, a transceiver module 1550, memory 1570, and a processor module 1565, which each may be in communication, directly or indirectly, with each other (e.g., over one or more buses). The transceiver module 1550 may be configured to communicate bi-directionally, via the antennas 1545, with the user equipment 115-*d*, which may be a multi-mode user equipment. The transceiver module 1550 (and/or other components of the base station 105-*e*) may also be configured to communicate bi-directionally with one or more networks. In some cases, the base station 105-*d* may communicate with the network 120 and/or controller 130-*a* through network communications module 1575. Base station 105-*d* may be an example of an eNodeB base station, a Home eNodeB base station, a NodeB base station, and/or a Home NodeB base station. For example, base station 105-*d* may be an example of eNBs 605 and/or 805 as illustrated in FIG. 6 and/or FIG. 8. Network controller 130-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with user equipment 115-*d* using different wireless communications technologies, such as different Radio Access Technologies. In some cases, base station 105-*d* may communicate with other base stations such as 105-*m* and/or 105-*n* utilizing base station communication module 1515. In some embodiments, base station communication module 1515 may provide an X2 interface within an LTE wireless communication technology to provide communication between some of the base stations 105. In some embodiments, base station 105-*d* may communicate with other base stations 105 through network controller 130-*a* and/or network 120.

The memory 1570 may include random access memory (RAM) and read-only memory (ROM). The memory 1570 may also store computer-readable, computer-executable software code 1571 containing instructions that are configured to, when executed, cause the processor module 1565 to perform various functions described herein (e.g., call processing, database management, message routing, etc.). Alternatively, the software 1571 may not be directly executable by the processor module 1565 but be configured to cause the computer, e.g., when compiled and executed, to perform functions described herein.

The processor module 1565 may include an intelligent hardware device, e.g., a central processing unit (CPU) such as those made by Intel® Corporation or AMD®, a microcontroller, an application-specific integrated circuit (ASIC), etc. The processor module 1565 may include a speech encoder (not shown) configured to receive audio via a microphone, convert the audio into packets (e.g., 20 ms in length) representative of the received audio, provide the audio packets to the transceiver module 1550, and provide indications of whether a user is speaking. Alternatively, an encoder may only provide packets to the transceiver module 1550, with the provision or withholding/suppression of the packet itself providing the indication of whether a user is speaking.

The transceiver module 1550 may include a modem configured to modulate the packets and provide the modulated packets to the antennas 1545 for transmission, and to demodulate packets received from the antennas 1545. While some examples of the base station 105-*d* may include a single antenna 1545, the base station 105-*e* preferably includes multiple antennas 1545 for multiple links which may support carrier aggregation. For example, one or more links may be used to support macro communications with user equipment 115-*d*.

According to the architecture of FIG. 15, the base station 105-*d* may further include a communications management module 1530. The communications management module 1530 may manage communications with other base stations 105. By way of example, the communications management module 1530 may be a component of the base station 105-*d* in communication with some or all of the other components of the base station 105-*d* via a bus. Alternatively, functionality of the communications management module 1530 may be implemented as a component of the transceiver module 1550, as a computer program product, and/or as one or more controller elements of the processor module 1565.

The components for base station 105-*d* may be configured to implement aspects discussed above with respect to device 1300 of FIG. 13 may not be repeated here for the sake of brevity. For example, base station 105-*d* may include an uplink resource scheduling module 1330-*a*, which may an example of uplink resource scheduling module 1330 of FIG. 13. Furthermore, uplink service ratio management module 1340-*a* may be an example of uplink service ratio management module 1340, and loading management module 1350-*a* may be an example of loading management module 1350. In some embodiments, the controller 130-*a* may be configured to implement aspects as described above with respect to the uplink service ratio module 1340-*b*, and may not be repeated here for the sake of brevity. Base station 105-*d* and controller 130-*a* may deployed as separate entities or as a combined entity.

In some embodiments, the transceiver module 1550 in conjunction with antennas 1545, along with other possible components of base station 105-*d*, may transmit information regarding scaling coefficients from the base station 105-*d* to the user equipment 115-*d*. In some embodiments, the transceiver module 1550 in conjunction with antennas 1545, along with other possible components of base station 105-*d*, may transmit information to the user equipment 115-*d*, to other base stations 105-*m*/105-*n*, or core network 130-*a*, such as uplink service ratio information such that these devices or systems may utilize multiflow operation.

In some embodiments, a handover module 1525 may be utilized to perform handover procedures of the base station 105-*d*. For example, if the user equipment 115-*d* is currently linked to the base station 105-*d*, the handover module 1525 may perform a procedure(s) for terminating the link and handing over the user equipment 115-*d* to another base station. Alternatively, if the user equipment 115-*d* is currently linked to the other base station, the handover module 1525 may perform a procedure(s) for establishing a link with the user equipment 115-*d* when the other base station hands over the user equipment 115-*d* to the base station 105-*d*.

These components of the device 1500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 16:
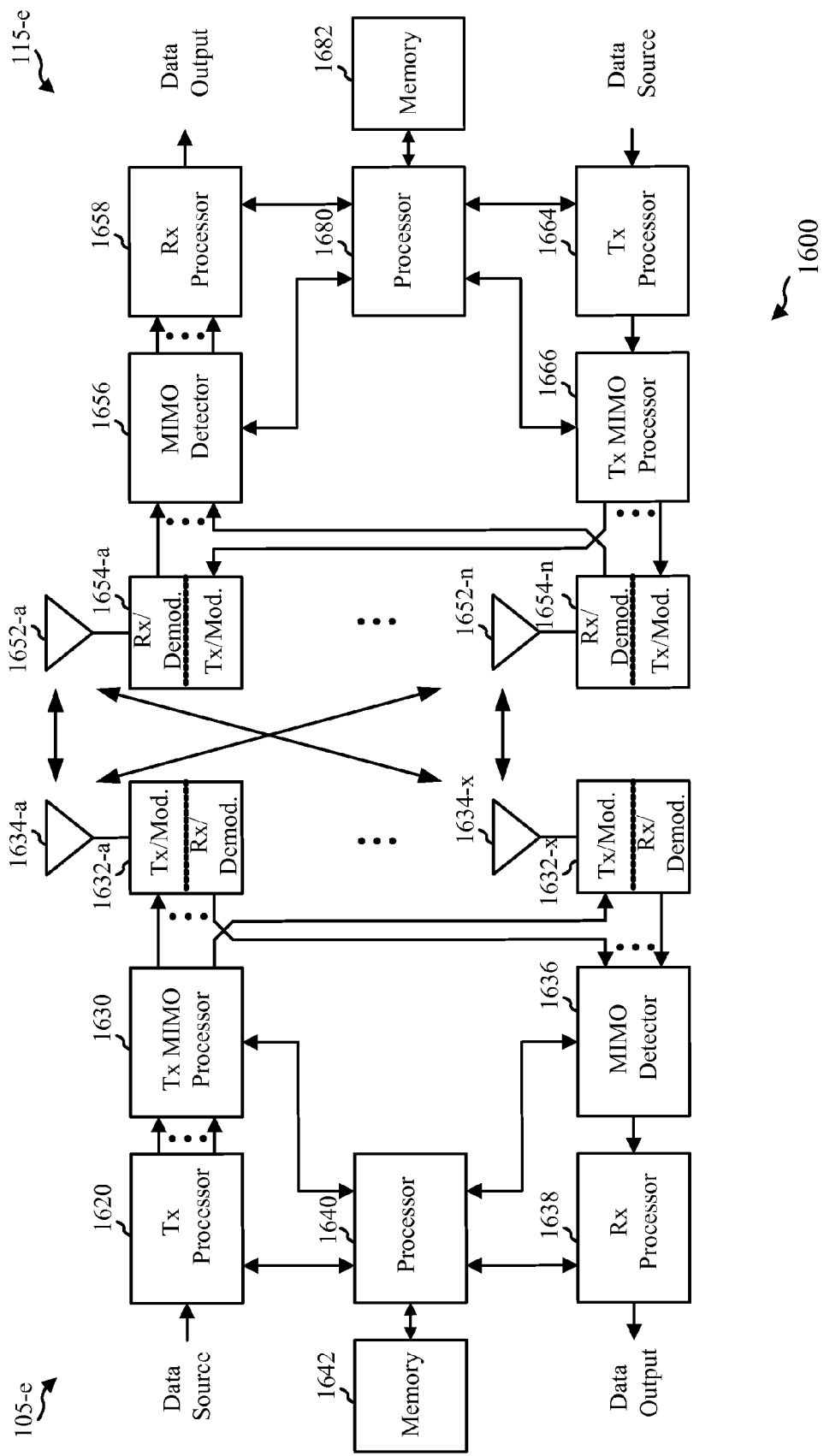
FIG. 16 is a block diagram of a system for uplink reporting in multiflow operation in accordance with various embodiments.

FIG. 16 is a block diagram of a system 1600 for uplink reporting in multiflow operation in accordance with various embodiments. This system 1600 may be an example of the system 100 of FIG. 1, the system 200 of FIG. 2, the system 600 of FIG. 6, the system 800 of FIG. 8, and/or the system 1500 of FIG. 15. The base station 105-*e* and/or device 115-*e* may be capable of Multiple-Input, Multiple-Output (MIMO) communications using multiple antennas. The base station 105-*e* may be equipped with antennas 1634-*a* through 1634-*x*, and the mobile device 115-*e* may be equipped with antennas 1652-*a* through 1652-*n*. Base station 105-*e* may be an example of eNBs 605 and/or 805 as illustrated in FIG. 6 and/or FIG. 8.

At the base station 105-*e*, a transmitter processor 1620 may receive data from a data source. The transmitter processor 1620 may process the data. The transmitter processor 1620 may also generate reference symbols, and a cell-specific reference signal. A transmit (TX) MIMO processor 1630 may perform spatial processing (e.g., precoding) on data symbols, control symbols, and/or reference symbols, if applicable, and may provide output symbol streams to the transmit modulators 1632-*a* through 1632-*x*. Each modulator 1632 may process a respective output symbol stream (e.g., for OFDM, etc.) to obtain an output sample stream. Each modulator 1632 may further process (e.g., convert to analog, amplify, filter, and upconvert) the output sample stream to obtain a downlink (DL) signal. In one example, DL signals from modulators 1632-*a* through 1632-*x* may be transmitted via the antennas 1634-*a* through 1634-*x*, respectively.

The transmitter processor 1620 may receive information from a processor 1640. The processor 1640 may be configured to determine uplink service ratios for UEs in concurrent communication with the base station 105-*e* and one or more other serving base stations. For example, the device base station 105-*e* may be serving a UE 115 for uplink communication. The UE 115 may be in concurrent uplink communication with another base station 105 using multiflow operation. The processor 1640 may calculate an uplink service ratio that allocates a portion of uplink service of the UE to the base station 105-*e* and another portion of uplink service of the UE to the other base station. The processor 1640 may send scaling coefficients to the UE for use in buffer status reporting to the base station 105-*e* and the other base station. The processor 1640 may determine loading of the base station 105-*e* relative to other base stations that may be serving some of the same UEs in multiflow operation. The processor 1640 may determine the uplink service ratios for UEs based at least in part on the relative loading of the base station 105-*e* and the other base stations. In some embodiments, the processor 1640 may be implemented as part of a general processor, the transmitter processor 1620, and/or the receiver processor 1638. A memory 1642 may be coupled with the processor 1640.

At the mobile device 115-*e*, the mobile device antennas 1652-*a* through 1652-*n* may receive the DL signals from the base station 105-*a* and may provide the received signals to the demodulators 1654-*a* through 1654-*n*, respectively. Each demodulator 1654 may condition (e.g., filter, amplify, downconvert, and digitize) a respective received signal to obtain input samples. Each demodulator 1654 may further process the input samples (e.g., for OFDM, etc.) to obtain received symbols. A MIMO detector 1656 may obtain received symbols from all the demodulators 1654-*a* through 1654-*n*, perform MIMO detection on the received symbols if applicable, and provide detected symbols. A receiver processor 1658 may process (e.g., demodulate, deinterleave, and decode) the detected symbols, providing decoded data for the mobile device 115-*e* to a data output, and provide decoded control information to a processor 1680, or memory 1682.

On the uplink (UL), at the mobile device 115-*e*, a transmitter processor 1664 may receive and process data from a data source. The transmitter processor 1664 may also generate reference symbols for a reference signal. The symbols from the transmitter processor 1664 may be precoded by a transmit MIMO processor 1666 if applicable, further processed by the demodulators 1654-*a* through 1654-*n* (e.g., for SC-FDMA, etc.), and be transmitted to the base station 105-*e* in accordance with the transmission parameters received from the base station 105-*e*. At the base station 105-*e*, the UL signals from the mobile device 115-*e* may be received by the antennas 1634, processed by the demodulators 1632, detected by a MIMO detector 1636 if applicable, and further processed by a receiver processor. The receiver processor 1638 may provide decoded data to a data output and to the processor 1680. In some embodiments, the processor 1680 may be implemented as part of a general processor, the transmitter processor 1664, and/or the receiver processor 1658.

In some embodiments, the processor 1680 is configured to perform uplink reporting in multiflow operation between the UE 115-*e* and multiple eNBs 105. In some embodiments, processor 1680 utilizes bearer level splitting for uplink reporting where the UE 115-*e* associates bearers or logical channel groups (LCGs) with eNBs for uplink reporting. For these embodiments, the processor 1680 may perform uplink reporting independently for each eNB based on the available data for uplink transmission in the LCG buffers associated with each eNB. In some embodiments, processor 1680 utilizes packet level splitting where the UE 115-*e* groups buffers for all LCGs into a common pool for uplink reporting. In these embodiments, the processor 1680 may perform uplink reporting based on the total amount of data available for transmission in a common buffer pool including data in all LCGs of the UE 115-*e*. The processor 1680 may determine and/or apply scaling coefficients to the amount of data in the common buffer pool for uplink reporting.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication by a user equipment (UE) in communication with a first cell and a second cell, comprising:
    establishing a first component carrier at the UE associated with the first cell;
    establishing a second component carrier at the UE associated with the second cell while maintaining the first component carrier;
    determining a set of logical channel groups having available data for uplink transmission from the UE;
    detecting that a first buffer status reporting condition has occurred;
    determining a first buffer status value based at least in part on a total amount of the available data for the set of logical channel groups upon occurrence of the first buffer status reporting condition;
    comparing the total amount of the available data to a threshold; and
    reporting the first buffer status value to the first cell, the second cell, or both based on the comparison,
    wherein the reporting comprises:
    reporting the first buffer status value to the first cell when the total amount of the available data is below the threshold; and
    reporting the first buffer status value to the first cell and the second cell when the total amount of the available data is equal to or above the threshold.

2. The method of claim 1, further comprising:
    detecting that a subsequent buffer status reporting condition has occurred;
    determining a second buffer status value based at least in part on a subsequent total amount of the available data for the set of logical channel groups upon occurrence of the subsequent buffer status reporting condition;
    comparing the subsequent total amount of the available data to the threshold; and
    discontinuing buffer status value reporting to the second cell when the subsequent total amount of the available data is below the threshold.

3. The method of claim 2, wherein the discontinuing buffer status value reporting to the second cell comprises reporting a buffer status value of zero to the second cell.

4. The method of claim 2, further comprising:
    reporting the second buffer status value to the first cell when the subsequent total amount of the available data is below the threshold; and
    reporting the second buffer status value to the first cell and the second cell when the subsequent total amount of the available data is equal to or above the threshold.

5. A communications device for communication with a first cell and a second cell of a wireless communications network, comprising:
    means for establishing at the communications device a first component carrier associated with the first cell;
    means for establishing at the communications device a second component carrier associated with the second cell while maintaining the first component carrier;
    means for determining a set of logical channel groups having available data for uplink transmission from the communications device;
    means for detecting that a first buffer status reporting condition has occurred;
    means for determining a first buffer status value based at least in part on a total amount of the available data for the set of logical channel groups upon occurrence of the first buffer status reporting condition;
    means for comparing the total amount of the available data to a threshold; and
    means for reporting the first buffer status value to the first cell, the second cell, or both based on the comparison,
    wherein the means for reporting is configured to:
    report the first buffer status value to the first cell when the total amount of the available data is below the threshold; and report the first buffer status value to the first cell and the second cell when the total amount of the available data is equal to or above the threshold.

6. The communications device of claim 5, further comprising:
means for detecting that a subsequent buffer status reporting condition has occurred;
means for determining a second buffer status value based at least in part on a subsequent total amount of the available data for the set of logical channel groups upon occurrence of the subsequent buffer status reporting condition;
means for comparing the subsequent total amount of the available data to the threshold; and
means for discontinuing buffer status value reporting to the second cell when the subsequent total amount of the available data is below the threshold.

7. The communications device of claim 6, wherein the means for discontinuing buffer status value reporting to the second cell is configured to report a buffer status value of zero to the second cell.

8. A communications device comprising:
a memory; and
at least one processor coupled to the memory and configured to:
establish, at a user equipment (UE) in communication with a first cell and a second cell, a first component carrier associated with the first cell;
establish at the UE a second component carrier associated with the second cell while maintaining the first component carrier;
determine a set of logical channel groups having available data for uplink transmission from the UE;
detect that a first buffer status reporting condition has occurred;
determine a first buffer status value based at least in part on a total amount of the available data for the set of logical channel groups upon occurrence of the first buffer status reporting condition;
compare the total amount of the available data to a threshold; and
report the first buffer status value to the first cell, the second cell, or both based on the comparison,
wherein the at least one processor configured to report is further configured to:
report the first buffer status value to the first cell when the total amount of the available data is below the threshold; and
report the first buffer status value to the first cell and the second cell when the total amount of the available data is equal to or above the threshold.

9. The communications device of claim 8, the at least one processor further configured to:
detect that a subsequent buffer status reporting condition has occurred;
determine a second buffer status value based at least in part on a subsequent total amount of the available data for the set of logical channel groups upon occurrence of the subsequent buffer status reporting condition;
compare the subsequent total amount of the available data to the threshold; and
discontinue buffer status value reporting to the second cell when the subsequent total amount of the available data is below the threshold.

10. The communications device of claim 9, wherein the at least one processor configured to discontinue buffer status value reporting to the second cell is configured to report a buffer status value of zero to the second cell.

11. A non-transitory computer-readable medium storing computer executable code for wireless communication, comprising code for:
establishing a first component carrier at the UE associated with the first cell;
establishing a second component carrier at the UE associated with the second cell while maintaining the first component carrier;
determining a set of logical channel groups having available data for uplink transmission from the UE;
detecting that a first buffer status reporting condition has occurred;
determining a first buffer status value based at least in part on a total amount of the available data for the set of logical channel groups upon occurrence of the first buffer status reporting condition;
comparing the total amount of the available data to a threshold; and
reporting the first buffer status value to the first cell, the second cell, or both based on the comparison,
wherein the reporting comprises:
reporting the first buffer status value to the first cell when the total amount of the available data is below the threshold; and
reporting the first buffer status value to the first cell and the second cell when the total amount of the available data is equal to or above the threshold.

* * * * *